INVENTOR.
Adiel Y. Dodge
ATTORNEY

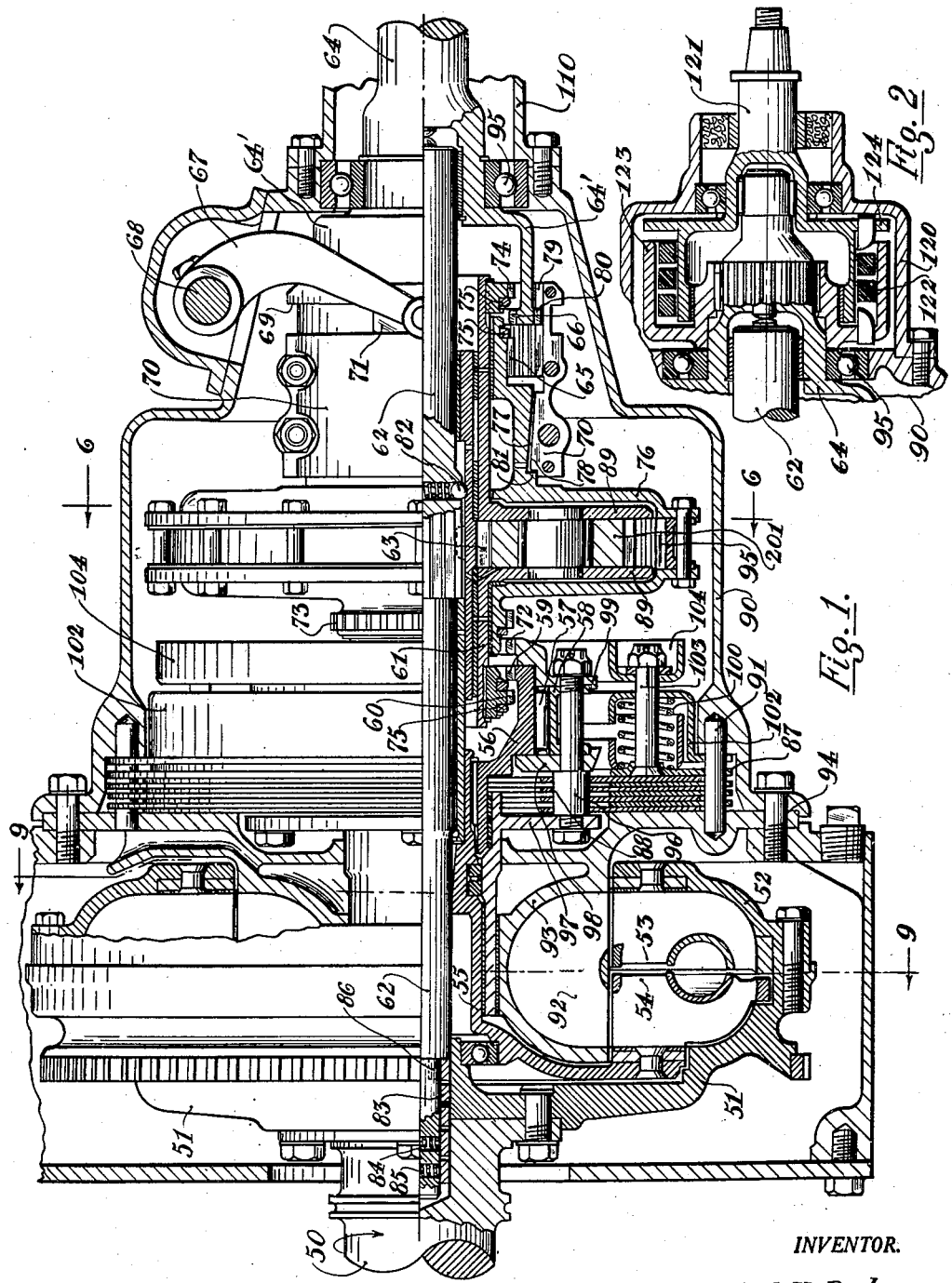

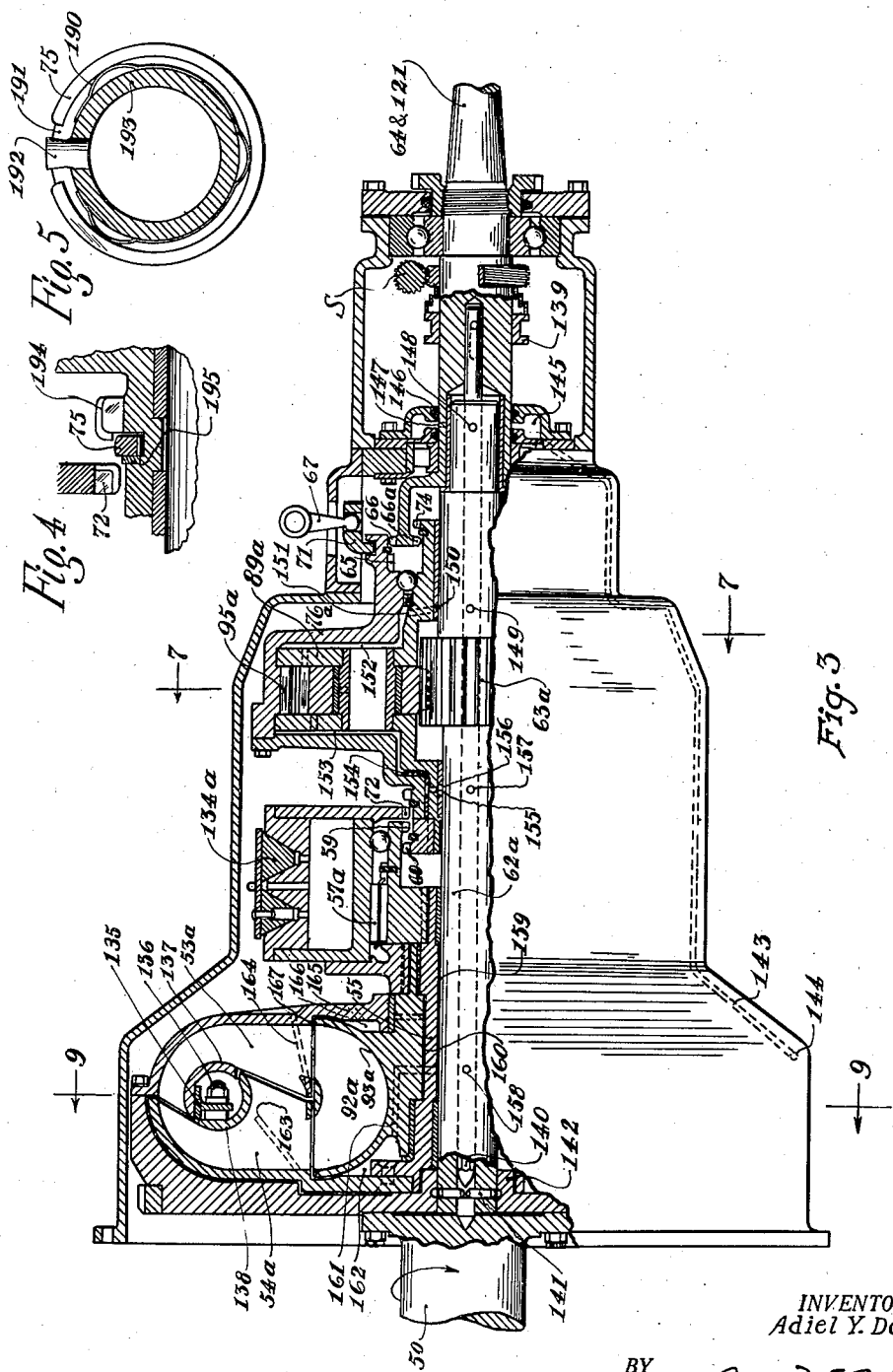

INVENTOR.
Adiel Y. Dodge
BY
ATTORNEY

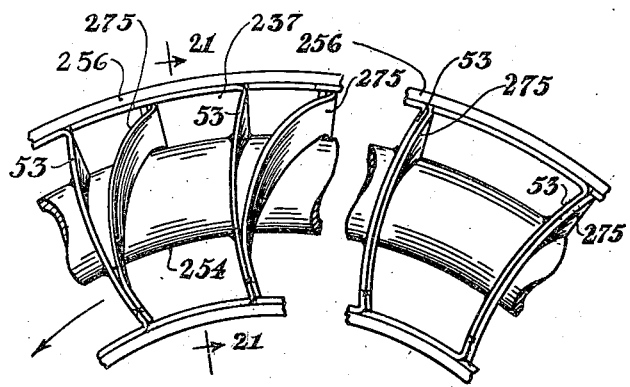
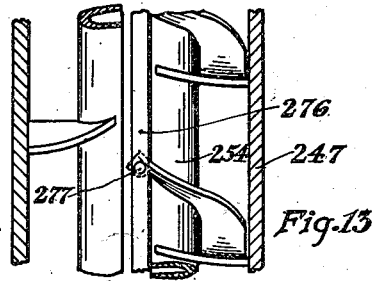
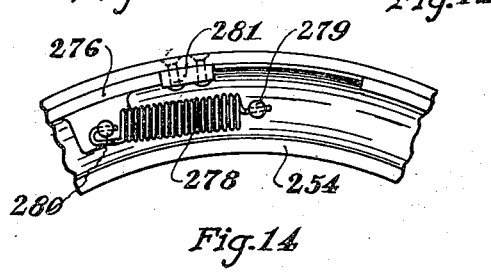
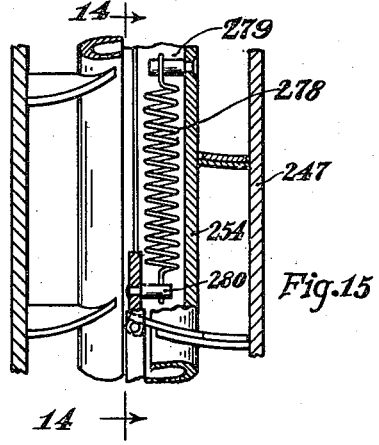
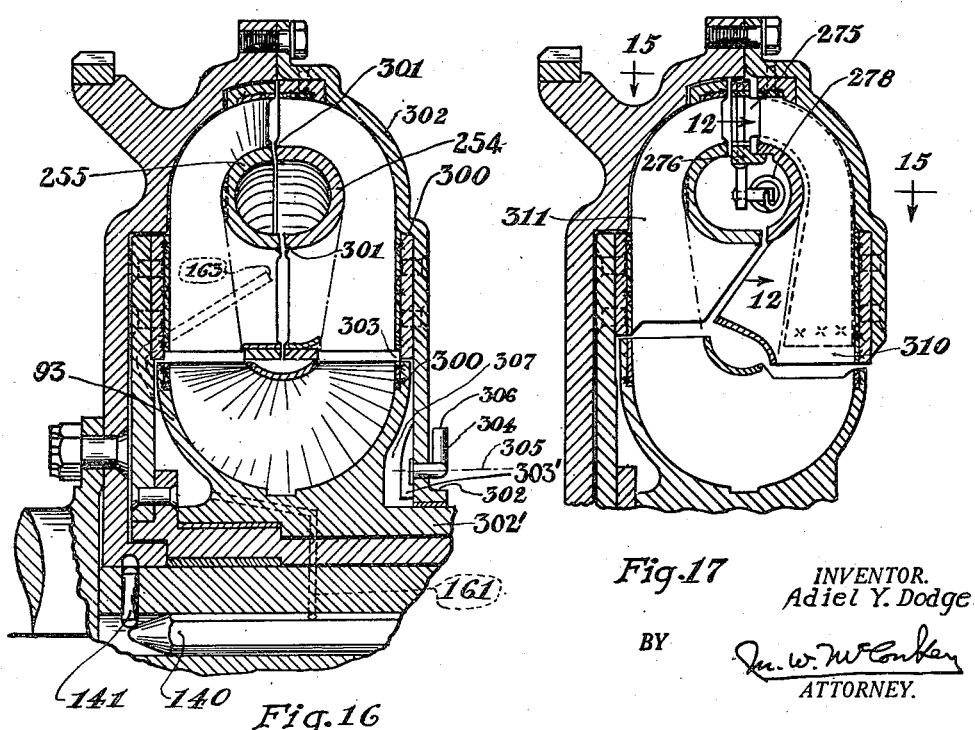
INVENTOR.
Adiel Y. Dodge
BY
ATTORNEY.

May 20, 1941.    A. Y. DODGE    2,242,515
TRANSMISSION
Filed April 30, 1934    8 Sheets-Sheet 6

INVENTOR.
ADIEL Y. DODGE
BY
ATTORNEY.

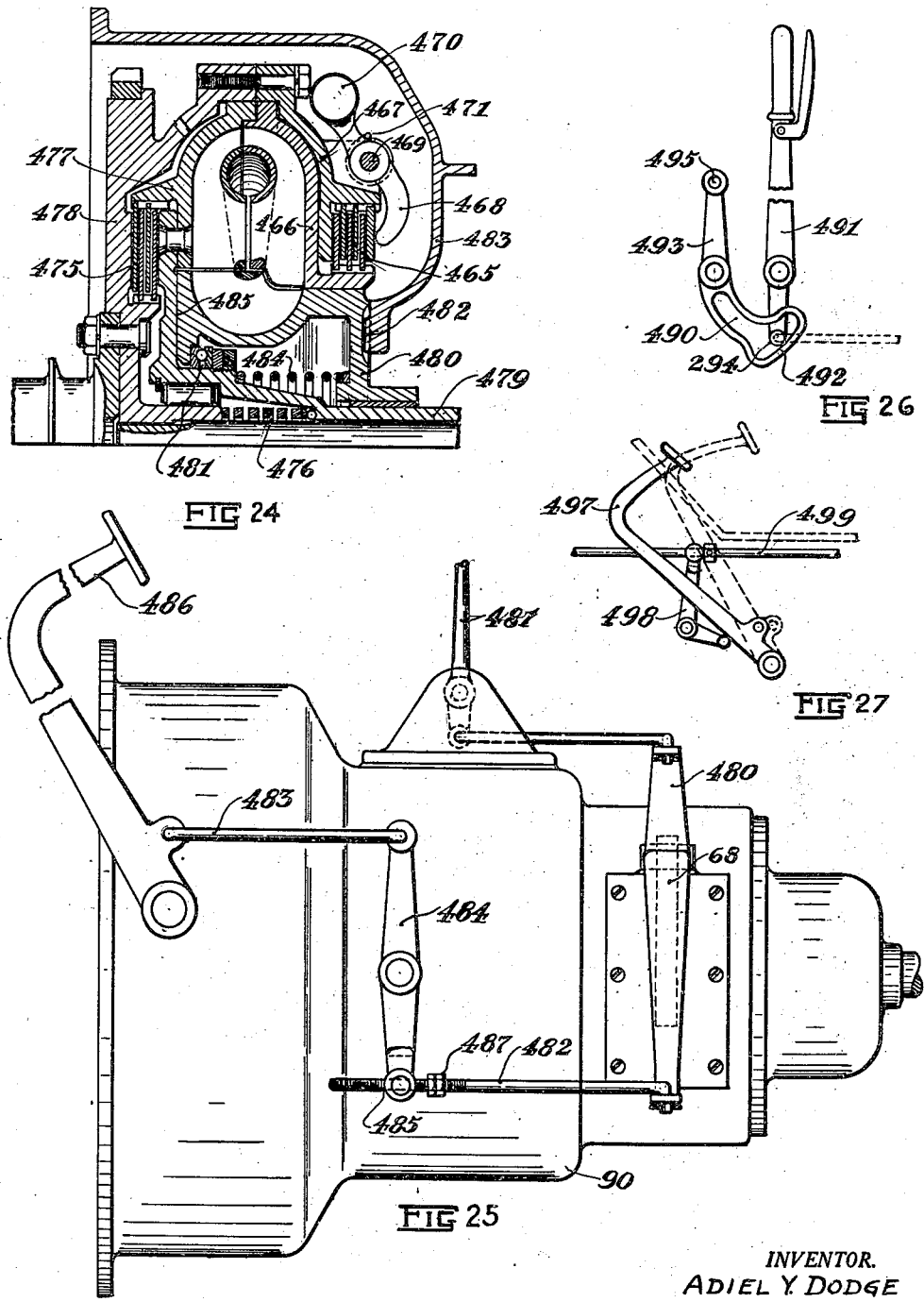

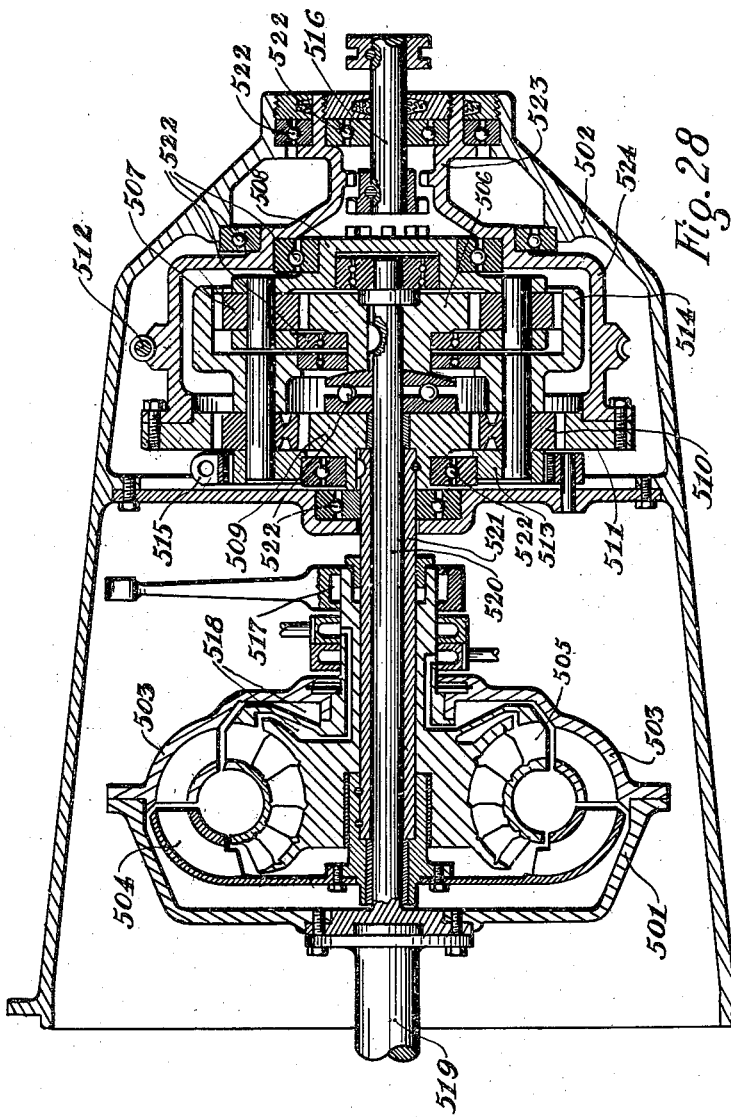

Patented May 20, 1941

2,242,515

UNITED STATES PATENT OFFICE 2,242,515

TRANSMISSION

Adiel Y. Dodge, South Bend, Ind.

Application April 30, 1934, Serial No. 723,083

34 Claims. (Cl. 74—189.5)

This invention relates to automatic transmissions, and is illustrated as embodied in several transmissions intended for use in automobiles.

A very important object of the invention is to utilize efficiently a hydraulic torque amplifier or converter. These converters have great advantages in the way of smoothness and quietness, but heretofore their use has been restricted by their very great inefficiency at low speeds, and to some extent by permitting them to slip at high speeds instead of arranging them to give at such speeds a direct drive at a one-to-one ratio.

One of the main features of the invention is therefore the arrangement of the transmission to utilize the most effective range of speeds of a hydraulic unit of this type, but with a positive mechanical drive for the ranges in which such a unit is not efficient. Preferably there is a positive geared low-speed drive, and I may use also a mechanically-connected direct one-to-one drive at high speed, together with an intermediate range in which the hydraulic unit is utilized to give a torque-amplifying speed increase varying gradually and smoothly automatically from "low" to "high."

Where such a mechanically-connected direct drive is not used, the novel arrangement of the parts of my transmission reduces the slip until it can be disregarded (e. g. to 5% or less at the output shaft).

In the various embodiments illustrated, this is accomplished by the use of balanced driving means such as a planetary gear or the equivalent, one of the elements of which is the driven means of the transmission, while the two other elements are driven respectively by the hydraulic unit and by a mechanical means, such as a drive shaft directly engaging the sun gear of the planetary unit, both the hydraulic unit and the drive shaft or its equivalent being driven by the same driving means, e. g. the engine crankshaft. As a matter of convenient arrangement, I prefer to space the hydraulic unit and the planetary gear apart along the drive shaft, with the other parts of the transmission arranged between them.

This arrangement permits the use of a one-way brake or the like to prevent reverse rotation of the driven element of the hydraulic unit, so that at low speeds this brake is effective to hold one element of the planetary gear stationary in such a manner that the sun gear drives the car positively at a predetermined low speed. As soon as the driven hydraulic element picks up enough speed to enter an efficient operating range, it picks up the element of the transmission which was previously held stationary, thereby gradually and smoothly increasing the speed through the intermediate range until one-to-one drive is reached for high speed. In some cases, as pointed out above, I prefer to provide centrifugal or other speed-operated means to lock all the parts together mechanically for rotation in unison to give a direct one-to-one high-speed drive.

In the preferred embodiments, the hydraulic unit is provided with means for directly by-passing the driving fluid from the impeller to the driven rotor as one-to-one drive is approached, so that thereafter the unit functions like what is known commercially as a "fluid flywheel" (i. e. a two-element hydraulic unit), whereas at lower speeds it functions as a true torque-amplifying three-element hydraulic torque converter. This has the substantial advantage that the third or "stator" element of the hydraulic unit may be bolted or otherwise fastened positively in place, since the fluid does not drag against it excessively at high speeds.

The above-described arrangement gives, in forward drive, a two-path flow of power in parallel or "series-multiple" from a single drive shaft, to a single driven shaft, with the novel torque amplifier arranged in one path.

Another important feature of the invention relates to taking advantage of the above construction to secure reverse drive without added parts, for example by connecting the propeller shaft or the equivalent driven shaft selectively to one or the other of two oppositely-driven parts of the planetary gear. As direct drive is not possible in reverse, and as high reverse speeds are not desirable, I prefer to simplify the operation in reverse by disconnecting one or the other of the two driving means. Thus in the preferred arrangement, the hydraulic unit is disconnected in reverse, the drive being a positive geared drive from the sun gear of the planetary unit. Alternatively, the mechanical drive may be disconnected, reverse drive being entirely from the hydraulic unit.

The embodiments illustrated in the drawings have various ancillary improved features in the construction and arrangement of the parts, and in the arrangement of the control means, which are described below and referred to in certain of the claims. The various illustrated modifications of the hydraulic unit, and the preferred arrangements of gearing, also embody in themselves substantial novelty and add greatly to the effectiveness and simplicity and smooth operation of the transmission. These and other objects and features of the invention, including numerous structural improvements and desirable arrangements and specific constructions and effective combinations of parts, will be apparent from the following description of the embodiments illustrated in the accompanying drawings, in which:

Figure 1 is a vertical longitudinal section through one form of transmission embodying my invention, with some of the parts shown above the center line in side elevation;

Figure 2 is a partial section showing a cushion drive which may be added to the transmission shown in Figure 1;

Figure 3 shows a side elevation, partly broken away in section, of a transmission embodying another modification of the invention;

Figures 4 and 5 are fragmentary sections showing on a larger scale detail parts of Figures 1 and 3;

Figures 11 and 12 are diagrammatic partial sections illustrating modifications in vane construction;

Figure 13 is a sectional view of Figure 11 showing the vanes in plan;

Figure 14 is a partial sectional transverse view on the line 14—14 of Figure 15;

Figure 15 is a sectional view of Figure 17 on the line 15—15 of Figure 17;

Figure 16 is an enlarged partial radial section of the flywheel and fluid elements of Figure 3, which elements are similar to Figure 1, although slightly modified;

Figure 17 is a sectional view similar to Figure 16 with certain modifications;

Figure 24 is a partial radial section of a modified form of my hydraulic vortex means, introducing automatic clutches;

Figure 25 is a side elevation with a preferred hook-up arrangement of control levers;

Figure 26 is a diagrammatic arrangement of one of the controls;

Figure 27 is a diagrammatic illustration of another control;

Figure 28 is a vertical longitudinal section of another modification; and

Figure 6:
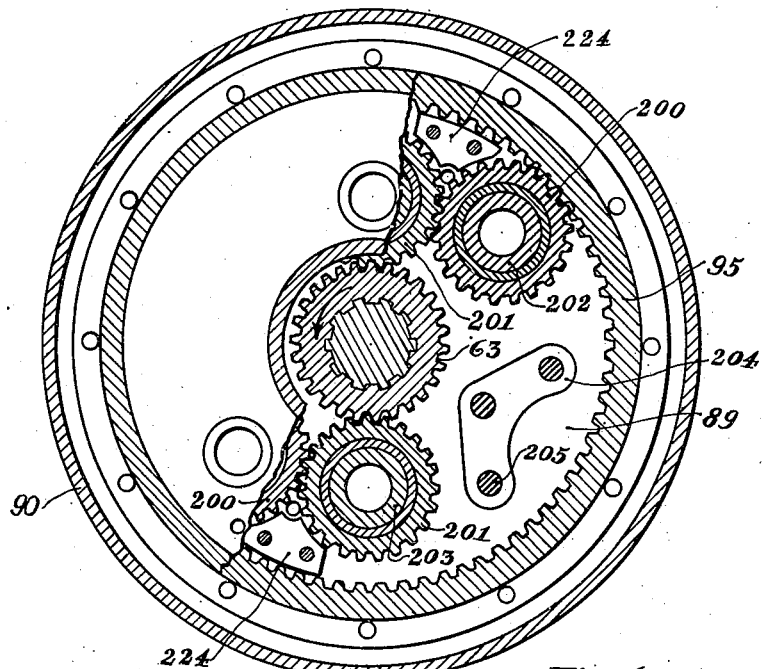
Figure 6 is a section on the line 6—6 of Figure 1.

In the embodiment of Figure 1 the above-mentioned objects are attained by hooking a special novel hydraulic vortex type torque converter in series multiple (i. e. in parallel) with a special planetary gear chain. Figure 1 is a section showing parts in side elevation, and part 50 shown therein is the end of a drive shaft such as the crank shaft of an internal combustion engine. The illustrated transmission is intended for use in an automobile having such an engine.

Attached to a flange at the end of crank shaft 50 is shown a fly-wheel 51, which in connection with a cooperating part 52 bolted or otherwise secured thereto forms an enveloping case to house the impeller and rotor blades. The impeller blades 53 turn with the fly-wheel, being secured to part 52, whereas the rotor blades 54 are not connected to the fly-wheel but are fixed to a rotor sleeve or stem 55. The rotor stem or sleeve 55 is shown fixed to a clutch hub 56 provided with an encircling series of one-way brake rollers 57.

The rollers 57, with an outer sleeve 58, form a one-way brake permitting the rotor member 55 to turn forwardly but preventing rotor member 55 from turning in reverse so long as a friction disc brake (hereinafter described) is engaged.

The operation of the friction disk brake is hereinafter more fully described, but it should be noted here that it includes disks 88 slidably arranged on bolts 96 rigidly connecting annular carrier parts 97, 98, and 99 with the sleeve 58 of the one-way brake, together with a cooperating series of disks 87 keyed to the housing by pins 91. The disks are normally held engaged by a series of springs 100 compressed between the outer disk 87 and an annular retainer stamping 102 seated against a ledge on the housing 90 and held by the pins 91. The springs 100 can be overcome, to disengage the brake, by two opposite bolts or the like 103 arranged respectively within the springs, and connected at their left hand ends to the last disk 87 and at their righthand ends to an operating ring 104, actuated by the clutch pedal or the like. Normally the above-described brake locks the member 58 to the housing, to serve as a stationary abutment for the one-way clutch rollers 57.

The clutch hub 56, held as described against rotation in one direction, is provided with clutch keys or teeth 59 which mesh with clutch teeth 60 on a stem or sleeve 61 forming part of a planetary cage 89, when this cage, forming part of an axially-movable planetary unit, is suitably shifted. The clutch teeth 60 are shown formed on a separate sleeve keyed or otherwise secured to the central stem or sleeve 61 formed on the planetary cage 89. In this way, the planetary cage 89 is also prevented from reverse movements so long as the above-described friction disc clutch remains engaged. However, when there is sufficient force acting against the rotor blades 54 to overcome the torque reaction, these blades 54 will pick up the load and cause the planetary cage 89 to turn forwardly, the torque passing from the blades 54 through the rotor stem 55 into the clutch hub 56, through the teeth 59 and 60, and into the planet cage stem 61.

A center shaft 62 is normally fixedly connected to the driving shaft 50 and therefore turns with the driving shaft 50. Splined to the center shaft 62 is a driving member such as a sun gear 63 which therefore normally turns with and at the same speed as the driving shaft 50 and the center shaft 62. Thus, planet gears 200—201 (Fig. 6) driven by the sun gear 63 and carried by the planet carrier 89 are caused to revolve whenever the driving shaft is revolving. It will be noticed that rotating force is put into the planet gear assembly through two paths: first, through the center shaft 62 and the sun gear 63; and second, through the rotor assembly inclosed in the parts 51—52 into the planet cage.

As explained below, the planet gears are so arranged that their driven ring gear 95 turns in the same direction as does the sun gear 63 when the planet cage 61 is held or turned forwardly. A driven shaft 64 normally turns with the ring gear 95 and its housing, a gear tooth clutch 65 normally engaging a second gear tooth clutch 66 to that end. Gear tooth clutch 66 is on an enlarged portion 64' secured to or integral with the driven shaft 64. It will be observed that, when rotor stem 55 and center shaft 62 turn at the same speed, the planetary gear assembly will turn as a unit about the main axis of the shaft 62, thereby turning the driven shaft 64 at the same speed as the driving shaft 50 and thus effecting a direct drive at one-to-one ratio.

By this means I am able to produce a full range of speed ratios lying between a fixed low speed ratio and one to one ratio, and also to deliver a corresponding full range of torque ratios, only slightly diminished due to losses in the hydraulic elements.

Means are provided to shift the entire planet gear assembly in a novel manner axially along the shaft 62 in order to engage and disengage all of the tooth clutches and for producing in one position where they are all disengaged a neutral position. The shift mechanism, in this embodiment, is shown as comprising a lever 67, and a trunnion block 71 traveling in a groove 69. As shown, the groove 69 is located in a cone clutch member 70, more fully described below. For the present, the clutch member 70 might be considered as rigid with the hub of the ring gear housing 76. By causing the lever 67 to revolve about the axis of its shaft 68 the entire planet gear assembly may be shifted fore and aft axially. As shown the transmission is in its neutral position, with all of the dog tooth clutches disengaged.

The transmission shown in Figure 1 and described above may be set in any one of four positions, as follows:

*Position No. 1.*—Neutral, as shown.

*Position No. 2.*—Forward. In this position the planetary assembly is shifted to the right so that clutch teeth 60 engage clutch teeth 59 and clutch teeth 65 engage clutch teeth 66.

*Position No. 3.*—This position is a further shift to the right in which case the long clutch teeth 65 still engage clutch teeth 66, but clutch teeth 60 engage clutch teeth 72 on the part 99. When in this position the transmission is at all times in positive low gear. Whether the engine is driving the car or the car is tending to drive the engine the gear ratio of the planetary gear chain prevails. This position may occasionally be used for descending icy hills or the like. In this position the hydraulic unit is disconnected from the planetary gear, and runs idly.

*Position No. 4.*—In this position the planetary gear assembly is shifted to the left until the clutch teeth 73 engage the clutch teeth 72, and the teeth 74 engage the teeth 66. In this position as in position 3, the action of the planetary gears is controlled by the friction disc clutch 87. However, in this fourth position reverse movements are effected inasmuch as the ring gear housing is now held fixed by the friction disc brake 87. The power is taken off the gear carrier 61—89, instead of the ring gear 95, and is delivered to the driven shaft 64 through clutch teeth 66. In reverse movements, as in position No. 3, the variable hydraulic speed elements are allowed to run idly.

It will be seen that the revolving parts of this transmission are supported entirely upon the center shaft 62 with the exception of the driven shaft 64 and the impeller housing 51 and 52.

To facilitate shifting, friction synchronizing rings 75 are provided, shown more fully in Figs. 4 and 5, but also shown as parts 75 in section in Figure 1. In addition to the rings 75, the synchronizing clutch 70 is provided. This clutch is in the form of a split hub which engages a hub on the ring gear housing 76. When the part 70 is shifted to the right, engagement takes place between two conical surfaces 77 and 78. These conical surfaces act as a brake to bring the speed of the clutch teeth 65 more nearly to that of the clutch teeth 66 before they actually mesh. The clutch 70 is provided with splines 79 which engage splines 80 integral with the enlarged portion 64' of shaft 64. When shifted to the left the clutch 70 engages the hub of the ring gear housing 76 on the plane surface 81; thus having less clutching action.

In order that cone clutch 70 will have no tendency to drag when the transmission is in neutral position, an auxiliary position finder is provided, for example in the form of a spring loaded ball 82 located in a transverse hole in the shaft 62, which ball drops into a groove in the stem of the sun gear 63. If desired, other grooves may be provided for the other gear positions. It will be noticed that the contour of the clutch teeth 59, 72 and 66 is rounded to permit the passage of the synchronizing rings 75.

While the center shaft 62 may be splined to either the flywheel 51 or the driving shaft 50, I prefer to have the center shaft 62 coupled to the fly-wheel 51 and the driving shaft 50 by means such as a coiled clutch 83 (Figure 1). The right end of the coiled clutch is embedded in the shaft 62 at 86. The two left coils of the clutch 83 are shown provided with excitation springs 84 and 85. This coiled clutch is arranged so that the driving force from shaft 50 in a counter-clockwise direction is transmitted to the center shaft 62, but driving force in a counter-clockwise direction, as viewed from the right end, e. g. when the car is driving the engine on a down grade, will be transmitted from 62 to 50 only to a predetermined amount depending in part upon the load imposed on springs 84 and 85.

Such an arrangement might be used for freewheeling purposes. However, in the illustrated case, I use it mainly as a safety measure. The load imposed on the springs 84 and 85 is preferably sufficiently large to cause the coiled clutch 83 when unwinding normally to turn the engine over when the car is coasting, so that the engine may be used as a brake. However, should by any mishap the engine become jammed, slippage will take place at the coiled clutch 83 before the rear wheels of the automobile are caused to slide. A similar safety feature I have introduced in two other places, hereinafter described.

In this way and by these means I have provided a transmission which may have control elements and characteristics identical, so far as the driver is concerned, with the present day transmission, having merely eliminated the necessity of shifting into second and high. In operation, the operator ordinarily first shifts from the illustrated neutral position to the forward position (i. e. position No. 2) previously described. The shift is made with the clutch pedal depressed, thereby opening or disengaging the friction disc brake plates 87 and 88 by a pedal connection acting on the ring 104. When the brake pedal is allowed to rise the brake plates 87 and 88 become engaged, thus causing the car to move forward in low gear, the reaction being taken from the planet cage 89 through clutch teeth 60 and 59 into the one-way brake 57 and thence through the brake discs 88 and 87 into the transmission case 90 through pins 91.

As the engine accelerates, the hydraulic force imposed on the rotor plates 54 increases until sufficient torque is reached to pick up the hub 56, relieving the load from the one-way brake 57 and thereby causing the tooth clutch 60 and the planet cage 89 to turn in a forwardly direction, slowly at first but increasing in speed as less torque is required at the rear wheels. In this way, the transmission progresses automatically through the full range of speed and torque ratios until approximately a one-to-one drive is reached.

During the intermediate ratios the torque reaction is imposed on stator blades 92 hydraulically. These stator blades 92 are fixed in a stator housing 93 which in turn is fixed to the transmission case 90 by fastenings 94. After starting no further shifting is necessary; stopping momentarily at stop-lights, etc., may be effected by depressing a pedal and allowing the engine throttle to close to an idling position. Shifting only becomes necessary for a prolonged stop or for a reverse movement.

The construction and arrangement of the vortex hydraulic torque converter, as above and hereinafter explained, embodies substantial novelty. Likewise the planetary gear arrangement utilized in the illustrated transmission is of new and novel form and arrangement. However, it should be especially noted that the "series multiple hook-up" between the vortex hydraulic torque converter and the planetary gears, as described above, to provide two paths of power flow is a combination which in many of its features I believe to be entirely new, and which has outstanding advantages.

In Figure 2 I have shown an alternative construction for the rear or right end of the transmission illustrated in Figure 1. Like parts bear the same character numbers in Figure 2 as are used in Figure 1. I here provide a rear auxiliary housing 120 to accommodate a second bearing for the shaft 64. In this housing there may, if desired, be located a free-wheeling device or a speedometer drive of conventional construction. In this figure, I show a cushion drive interposed between the shaft 64 and a driven shaft 121. This cushion drive may consist of a heavy coiled spring 122, one end of which is embedded in a drum 123, and the other end of which is embedded in a flange 124 integral with the shaft 121. The hub of the drum 123 is shown splined to the shaft 64.

In this way, I have provided an internal and external drum into which and onto which the coil spring 122 may wrap. The cushion drive is limited to a predetermined amount of cushioning in either direction after which the coil spring wraps solidly onto or solidly into, depending on the direction of the drive, the corresponding drum, thus producing more nearly a solid drive. Among other things this cushion drive is provided to facilitate and quiet the shifting of the clutches.

In Figure 3 I have a somewhat simpler transmission of the same general type as shown and described in Figure 1 and having many of the same advantages. In Figure 3 similar or corresponding parts bear the same reference numbers as the corresponding parts in Figure 1, with a suffix a. In this figure, also, I have shown a band type brake 134a instead of the friction disc brake 87. In both cases the brakes are normally engaged. The band type brake 134a is more fully described and shown and is claimed in my co-pending application No. 693,569, filed October 14, 1933 now matured into Patent No. 2,082,444.

Figure 3 also shows an automatically centrifugally actuated clutch 135, described below, acting between the impeller assembly and rotor assembly, the blades of which are indicated at 53a and 54a respectively. This clutch is of the shoe type, similar to that shown in Figure 7 at 217. The clutch shoes 135 are pivoted on pins 136 located in the driven core 138. When centrifugally expanded the shoes 135 engage the driving core 137, thus frictionally engaging and locking together the impeller 137 and the rotor 138 to cause them to turn at the same rate and effecting a one-to-one drive. It is often desirable to effect such a one-to-one direct drive at speeds above a predetermined high speed, e. g., above 40 or 45 miles an hour, thus eliminating slipping and increasing efficiency.

Another feature shown in Figure 3, and which may be used if desired, consists of a mechanical release to disengage the center shaft 62a. This disengagement may be effected by the last inch of a pedal movement when the pedal is suitably hooked up to a shaft collar 139 (similar to the hookup shown in Figure 25 and hereinafter described). By shifting the collar 139 rearwardly or to the right, a hexagonal rod 140 is moved out of engagement with clutch pins 141, allowing the clutch pins 141 to move radially inward, thus disengaging the fly-wheel hub 142. This release is intended for use only in emergencies to effect a complete disengagement between the driving and driven parts. This release is arranged so that the only load on the release rod 140 to be overcome when releasing as described is a frictional drag at right angles to the driving force, thus making it possible to release even though under full load.

In Figures 1 and 3 I have shown, and will now describe in connection with Figure 3, a means of lubrication. In order to insure proper lubrication, lubricants should be fed in as nearly at the central axis as possible, so that centrifugal force will tend to carry the lubricant outward, whereas with a splash system centrifugal force tends to throw the lubricant away from the center parts. However, it is proposed that some of the parts of this transmission shall run in a bath of oil. In the transmission shown in Figure 3, it is proposed that the same fluid be used for the hydraulic vortex as is used for lubricating the running parts of the transmission. In addition to furnishing a force feed lubrication I have therefore furnished circulating means to circulate driving fluid into and out of the hydraulic vortex chambers.

Running from the low part of the case I have provided a tube 143. Preferably the mouth of the tube 144 is turned to face the direction of swirl of the fluid. From this point, the tube 143 conducts the fluid up to a ring 145 surrounding the driven shaft, and which is provided with suitable axially-spaced packing glands 146 engaging the shaft. Fluid is drawn from this ring through holes 147 and 148 into the hollow center of the shaft 62a. It will be noticed that the rod 140 lying in the center of the shaft 62a is hexagonal in cross-section, thus providing passages between the round bore in the shaft 62a and the hexagonal flats of the rod 140.

Fluid passes from the hole 148 around the rod 140, which may be made round at this point, to a hole 149 in the shaft 62a. The hole 149 communicates with a groove 150 in a surrounding bushing. The groove 150 communicates with a passage 151 in the planet cage 89a. By suitably arranging the planet gears, as described below in connection with Figures 6 and 7, they act as gear pumps drawing fluid into the space 152 between the planet cage 89a and the ring gear cage 76a. Fluid drawn in between the planet gears is compressed and discharged under pressure on the opposite side into the space 153.

Fluid is thereby positively forced from this space through suitable slots 154 to communicating holes 155, 156, and 157, back into the hollow shaft 62a. The rod 140 may be made round in section and nearly filling the bore of shaft 62a at a place directly under the sun gear 63a, in order to provide a dam against the short-circuiting of the circulating fluid. Other suitable oil holes may be provided in a similar manner to lubricate other bearings along the shaft 62a.

The remaining fluid passes out of a hole 158 in the shaft 62a and fills a space 159 between the shaft 62a and the rotor stem 55a. Oil is communicated from this space to an outer space 160 through a suitable opening in the rotor stem 55a. From the space 160 the fluid circulates thru a drilled passage 161 into an annular chamber 162. From here the fluid is carried centrifugally into the vortex circuit through suitable openings 163 which are arranged to admit the fluid generally in the direction of circulation of fluid in the vortex.

When the vortex becomes entirely filled with fluid the fluid is discharged from the vortex chambers thru passages 164 and 165. It will be noted that the passage 164 passes through one of the impeller vanes 53a from what might be called a focal or central point where the pressure of fluid will be zero until such time as the vortex chambers are entirely filled. It will also be noted that the passage 165 does not actually enter the vortex chamber; it merely acts to relieve the pressure in the space 166, forming an auxiliary outlet for the vortex chambers if they should become too full. In the arrangement of Figure 3 the alignment of the stator shell with the impeller shell is such that the fluid tends to jump over the space 167 between the two shells, so far as its velocity pressure is concerned, but should the static pressure become too great fluid may be forced out through this space 167.

The static or pressure head may be controlled by varying the radial position of the passage 165.

In this way, I have provided means for circulating fluid into and out of the vortex chambers and means for automatically preventing the building up of a static fluid pressure above a desirable point in the vortex chambers. By means of this circulation of fluid into and out of the hydraulic vortex, and due to the comparatively large surface and quantity of fluid in the entire transmission, I have secured very effective heat dissipating means. The surplus fluid provides a time element for dissipating the heat to the transmission casing and thence to the surrounding atmosphere. The entire outer surface of the case therefore in effect provides cooling area. The swirl of the fluid in the case provides turbulence to bring the fluid into engagement with this cooling surface.

Figure 3 also shows at S a conventional speedometer drive which may be used in any of the illustrated embodiments.

In Figure 4 I have shown a fragmentary section of the synchronizing ring 75 on a larger scale. Figure 5 shows the synchronizing ring 75 viewed in elevation, in a plane extending across the main axis of the transmission. Synchronizing ring 75 is held centered yieldingly by an undulated spring 190. It will be seen from these two figures that the ring 75 is a divided ring seated in a suitable groove or recess 191. The groove 191 is interrupted by a suitable abutment 192 which may be a pin inserted across the groove 191, or which may be integral with the shaft 193. The ring 75 is yieldable, preferably being made of spring steel, its normal outside diameter being too large to pass under the clutch teeth such as 72 in Figure 4. Clutch teeth 72 are suitably rounded in contour as also is the outer surface of the synchronizing ring 75, so that when force acting in an axial direction tends to push the ring 75 under the teeth 72, a wedging action takes place, causing the ring 75 to contract. Friction is thereby set up between the teeth 72 and the ring 75. The ring 75 moves into engagement with abutment 192.

It will be seen that further friction against the outer surface of the ring 75 sets up an internal wrap or self-energization, and in this way considerable friction is created between the teeth 72 and the synchronizing ring 75. This friction has a tendency to bring the shaft 193 and the clutch teeth 72 to the same speed or, in other words, to synchronize the teeth 72 with the teeth 194. It will also be seen that when the synchronizing ring 75 has passed completely under the teeth 72, and when teeth 194 have meshed with the teeth 72, the synchronizing ring will expand on the opposite or left-hand side of the teeth 72, thus retaining the teeth 72 and the teeth 194 yieldably in mesh. Other means may be provided if desired to prevent the teeth 194 from shifting too far to the left.

In this way, the synchronizing ring 75 answers two purposes; first, the function of synchronization; and second, the function of position retaining. Synchronizing ring 75 may be pulled back from the left side under the teeth 72, due to their contour, in the same manner as previously described in passing from the right to the left. It will be noted that the synchronizing ring will bring about synchronization for revolution in either direction.

In order to guard against centrifugal force (at high speeds) throwing the synchronizing ring 75 out of place, it is arranged so that a portion of the ring projects under a counter-bored portion of the teeth 194. In order to facilitate assembly of this arrangement, a spacer ring 195 may be introduced to fill up the surplus width of the slot 191. The spacer ring 195 may be locked in place by any suitable means, not shown.

Figure 6 shows a section along the line 6—6 of Figure 1. The ring gear housing is shown with one side removed and with a portion of the planet cage housing broken away, to show the planet gears, the sun gear, and a portion of the ring gear in section. As shown in Figures 1 and 6, the ring gear 95 is secured to and turns with the ring gear housing 76. During forward movements the final driven shaft is coupled with the ring gear 95 and therefore turns at the same speed. Ordinarily the ring gear of an internal planet system turns in a direction the reverse of the direction of revolution of the sun gear, when the planet cage is retarded. However, by utilizing planet gears 200 and 201 in pairs, as shown in Figure 6, so that each planet gear 201 meshes with the sun gear 63 but not with the ring gear, and each planet gear 200 meshes with the corresponding planet gear 201 and with the ring gear 95 but not with the sun gear 63, the ring gear 95 is caused to turn in the same direction as the sun gear, when the planet cage 89 is held against rotation or when the planet cage 89 is driven forwardly.

Trunnions 202 and 203, on which the planet gears 200 and 201 revolve respectively, are mounted on the planet cage 89. Therefore, precession of the centers of the planet gears 200 and 201 about the main axis depends on the rate of revolution of the planet cage 89. In order to secure the right and left hand discs 89 rigidly together to form a suitable planet cage, spacers 204 and bolts 205 are used.

It will be seen that reverse movements of the driven shaft may be secured by shifting the planetary gears, as previously described, in a manner which will provide means for holding the ring gear against movement and cause the planetary cage to become connected with the driven shaft while the sun gear remains connected to the driving member. Thus, when the ring gear is held fixed, revolution of the sun gear 63 in a forward direction, as indicated by the arrow, i. e. counter-clockwise as viewed in Figure 6, will cause the planet cage to turn clockwise or in a direction the reverse of the direction of revolution of the driving member 63. The means for effecting this change or shift is shown in and has been described in connection with Figure 1 and is effected by shifting the entire planetary gear assembly as previously described.

Parts 224 curved about the peripheries of the planet gears 200 and 201 cooperate with them to give a gear pump action circulating the lubricating fluid, as has already been described.

Figure 7:
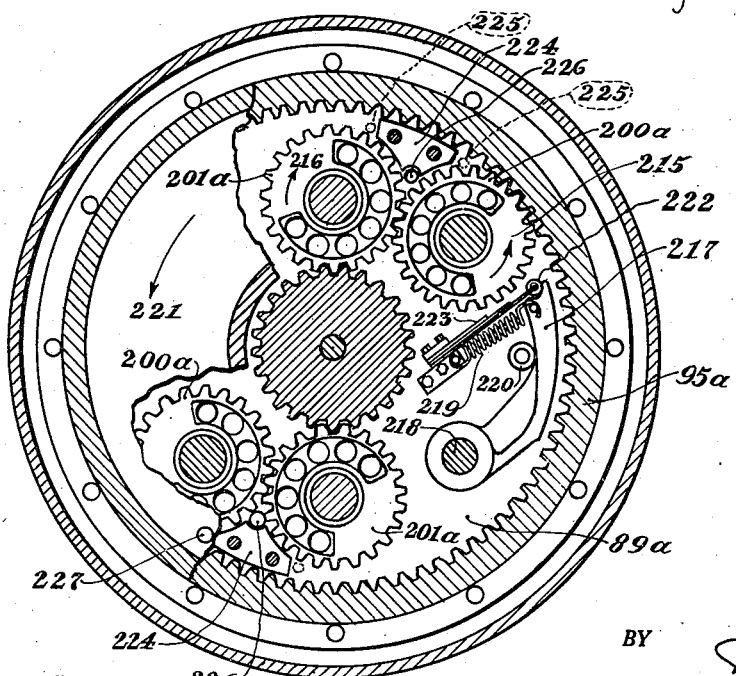
Figure 7 is a section similar to Figure 6 but with the addition of a centrifugal clutch.

Figure 7 shows a modification generally similar to Figure 6, being a transverse section along the line 7—7 of Figure 3. The arrangement of the shaft is however somewhat different in this modification. In Figure 7 I have shown the planet gears 200a and 201a having counter-weights 215 and 216, respectively. When so counter-weighted their revolution about their own centers and their precession about the main axis will set up positive and negative impulses: viz., positive impulses tending to drive the planet cage 89a forwardly and negative impulses tending to drive the planet cage 89a in a reverse direction. Due to the flywheel effect of the revolving parts, these positive and negative impulses will cancel each other, bringing about a zero result until such time as the planet gears cease to revolve about their own centers. When the planet gears come to rest about their own centers, the counter-weights 215 and 216 will seek an outermost position remote from the main axes and will tend to remain in such position due to centrifugal force. By this means a one to one direct drive is effected within certain torque limits by causing the planet cage 89a to turn with and at the same speed as the ring gear 95a.

As a further means to effect such a one-to-one drive, I may provide one or more centrifugal shoe clutches 217 mounted in the planet cage 89a and each pivoting on a pin 218 fixed transversely in the planet cage 89a. The centrifugal shoe 217 is urged inwardly by a spring 219 against a stop 220, thus being held normally out of engagement with the cylindrical inner faces of the teeth of the internal ring gear 95a. However, when the rotative speed of the planet cage exceeds a predetermined rate, centrifugal force will overcome the spring 219 allowing the clutch shoe 217 to swing outwardly and engage the ends of the teeth of the ring gear 95a. Since the direction of forward revolution of planet cage 89a is counter-clockwise as shown by arrow 221, the clutch shoe 217 as shown is arranged to have a relatively large measure of self-actuation.

In order that the clutch shoe 217 may have a decisive action, and in order to reduce to a minimum the range during which the shoe 217 would hesitate between engagement and disengagement, I have introduced a spring loaded roller 222 which engages a groove in the end of the shoe 217. Since the leaf spring 223 which loads the roller 222 normally holds it in the groove in the end of shoe 217, it becomes necessary for the shoe 217 to overcome a substantial holding force caused thereby in order to move outwardly and become engaged. However, after the shoe 217 has moved outwardly and engaged the ring gear, the roller 222 no longer rides in the groove in the end of the shoe 217, but rides on a rounded surface at the end of the shoe 217 adjacent the groove. Thus the force of the spring 223 and the roller 222 tend to hold the shoe 217 engaged after it once becomes engaged. I have described two means of effecting a one-to-one direct drive besides the one described in connection with Figure 3. Any one of these three methods may be used, or it is feasible to use any two or all three of them in combination to effect the desired one to one direct drive.

In Figure 7 I have also further illustrated the means whereby I make use of the planet gears for the purpose of circulating the oil. By inserting blocks 224 between the planet gears, a suitable housing is produced which causes the planet gears to become gear pumps in accordance with well known practice. As the planet gears turn in the directions indicated by the arrows thereon, the oil is drawn in through ports 225 and forced out through ports 226. The ports 225 are shown dotted, since they are located in the half of the planet cage which is not shown. In the part not broken away the communicating passages are shown properly at 227. This circulation of oil may if desired be used as a further means tending to give a one-to-one direct drive, as more fully described in my Patent No. 1,857,365, granted May 10, 1932.

Figure 9:
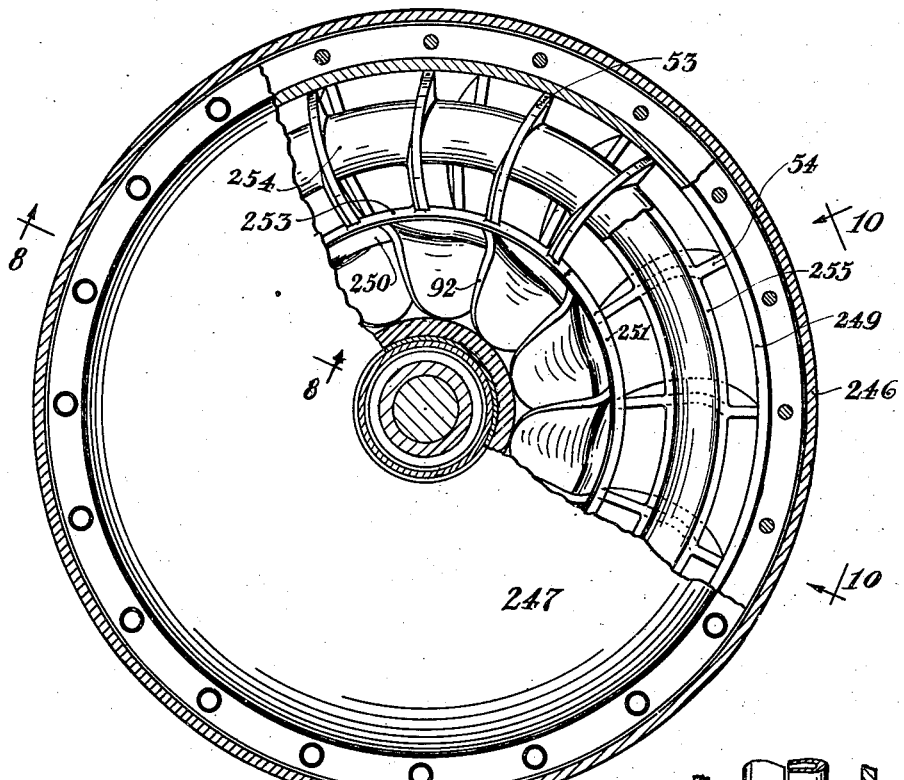
Figure 9 is a section on the line 9—9 of Figure 1, and approximately the same as a section along the line 9—9 of Figure 3.
Figure 8:
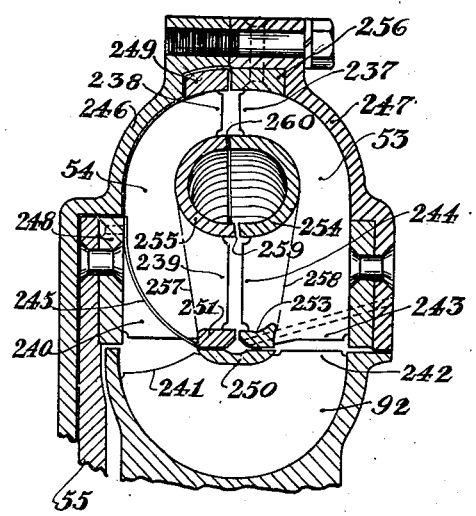
Figure 8 is a partial section taken on the section line 8—8 of Figure 9.
Figure 10:
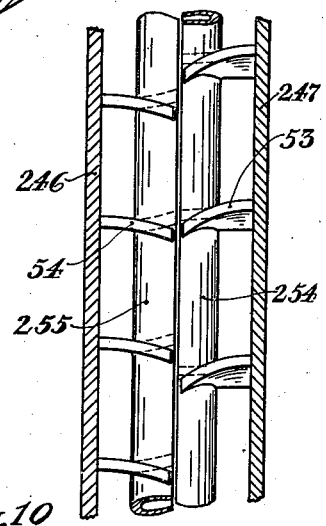
Figure 10 is a fragmentary section looking in the direction of the arrows 10—10 of Figure 9.

Figure 8 is a fragmentary radial section of Figure 1 showing the hydraulic vortex of this embodiment, somewhat enlarged and in more detail. Figure 8 is also a section of Figure 9 on the line 8—8, and Figure 9 is a transverse section of Figure 1 on the line 9—9. The hydraulic vortex or hydraulic torque converters shown in these figures are of a type which in themselves embody substantial novelty. Among other advantages, they embody the most desirable characteristics of both the two element and the three element types of hydraulic vortex, i. e. the so-called "fluid flywheels" (two element) and "torque converters" (three element).

As will be clearly seen in Figure 8, the fluid is set in motion by the impeller blades 53. The fluid thus set in motion passes between the impeller blades 53 and out of the impeller, through openings 237, entering the rotor at points 238 and passing between the rotor blades 54. Fluid may pass out of the rotor at either points 239 or 240. In the latter case, i. e. at low speed and substantial torque amplification, the fluid enters the stator at points 241 and passes between the stator blades 92, leaving the stator at points 242 and entering the impeller at points 243. The route just described, outlines the path taken by the fluid when the hydraulic vortex is operating as a three-element hydraulic torque converter. Should the fluid leave the rotor at points 239 and enter the impeller at points 244, then my hydraulic vortex operates as a two-element fluid fly-wheel. In operation, my hydraulic mechanism sometimes operates in one of the manners above described, while under other conditions it operates in the other manner, and under some conditions it may operate in a manner which is a combination of the two.

When the impeller is revolving at a relatively high rate, compared with the rate of revolution of the rotor, i. e. when the vehicle is moving at a low speed, my hydraulic vortex operates as a three-element hydraulic torque converter, the fluid taking the longer path and passing down between the stator blades 92. This is due to the centrifugal force imparted to the fluid by the relatively high rate of revolution of the impeller, which at such a time is considerably greater than the counter force imposed upon the fluid by the relatively slower rotation of the rotor. The velocity at the discharge points 237 is sufficiently high to carry the fluid over the longer path, i. e. between the stator blades. When operating in this manner, the fluid is returned to the impeller from the stator at a considerable velocity and in a direction having a relatively large component in the direction of movement of the impeller blades at points 243. The direction of flow of the fluid when passing between the stator vanes 92 is partly reversed, both as to its radial and circumferential directions. The substantial reversal of its circumferential direction imposes a substantial torque upon the stator, in the opposite direction to the direction of revolution of the impeller. As is well known, it is by this means that a hydraulic torque converter is enabled to amplify torque, the stator forming the necessary reaction member.

When the rotative velocity of the rotor blades 54 nearly reaches the rotative velocity of the impeller blades 53, the counter force imposed on the fluid by the rotor more nearly equals the centrifugal force imparted by the impeller, thus encouraging the fluid to take the shorter path, leaving the rotor at points 239 and entering the impeller at points 244. Under extreme conditions, at or near a one-to-one drive, substantially all of the fluid takes this shorter path, in which case my hydraulic vortex operates as a two-element fluid flywheel, without torque multiplication. However, when the driven member turns at substantially the rate of the driving member no torque multiplication can in any event be expected, nor is it desired in the present case. It is therefore not desirable at this time to have the fluid circulate over the stator blades as for the sake of efficiency, I do not desire any circulation of the fluid over the stator blades at speed ratios of approximately one-to-one.

When the transmission is used without the mechanical clutching means 135 or 217 or 215, or the equivalent, to give direct drive at high speeds, there will at high speeds still be a slight slip of the rotor relatively to the impeller. However, at wide open throttle this slip at the vortex will be not more than approximately 10%, which means about 7% at the output shaft 64, and at less than wide open throttle (i. e. in all ordinary driving) the slip will be much less. Unless specifically otherwise limited, it is my intention that the phrases "one to one drive," "direct drive," and the like be interpreted broadly enough to include a drive having this slight slippage which is so small even at the vortex device and is still further reduced in effect by the planetary drive arrangement.

At speed ratios approaching the ratio of one-to-one, portions of the fluid may take both the longer and the shorter paths. In some cases this may be desirable, but in cases where it is undesirable for the fluid to take both paths at this time I propose to provide flexible guide vanes 245, located between the rotor blades 54. The flexible guide vanes 245 are secured to the rotor shell at their outer ends by some suitable means such as rivets. These flexible vanes 245 by their own elasticity, aided by the centrifugal force, will cause the fluid to take the shorter path until such time as the velocity pressure of the fluid deflects the vanes 245 yieldingly back against the rotor shell. When thus deflected back against the rotor shell, the fluid has a free passage to take the longer course, between the stator blades, as previously described. When the flexible vanes 245 are so deflected against the rotor shell they are in a radial plane, and when in this position, the action of centrifugal force no longer urges the vanes 245 to close the openings 240. In this way, centrifugal force is made use of to impart a decisive action to the blades 245, that is, to eliminate an indecisive or fluttering action.

There are certain substantial advantages in the illustrated skeleton rotor construction. Part 246 may be considered the flywheel proper, and the part 247 bolted thereto may be considered the impeller shell. Parts 246 and 247 together form a hollow flywheel, turning at engine speed. Heretofore, it has been usual to form a complete rotor shell as shown in Figures 3 and 28. In Figures 1 and 8, however, I provide a rotor which makes use, in effect, of the flywheel 246 as a portion of the rotor shell. In other words, I have provided a skeleton shell carrying the driven vanes 54 and comprising an annular disc 248 and an outer ring 249. The portion of the rotor blades 54 along their outer edge between the disk 248 and the ring 249 are exposed to the flywheel housing 246, with only the necessary running clearance therebetween. This arrangement not only lightens and cheapens the construction, but it produces added efficiency in the two following ways: First, it reduces the amount of surface to which fluid is subjected, since the fluid does not extend into any space between the impeller and rotor shells as in previous constructions. Second, since the housing 246 is a portion of the driving member, its inner surface will continue to impart some driving force to the fluid which circulates over it, thus increasing the effectiveness of the impeller.

In order to fix the vanes securely and lend them stability I have provided suitable inner rings 250, 251, and 253, in addition to the usual toroidal core comprising halves 254 and 255 carried by the impeller and the rotor respectively. It will be seen that the rings 250, 251, and 253 are suitably placed to form an auxiliary core, separating the two above-described paths of fluid circulation.

In order that my hydraulic mechanism may promptly change its character from a two element fluid flywheel to a three element torque converter and vice versa, without acquiring or discharging undue quantities of fluid suddenly, I have made the following provisions: The space or chamber lying between dotted lines 257 and 258 in Figure 8 and the space or chamber lying inside of the core between the parts 254 and 255 are of sufficient volume to fill or nearly fill the stator. That is, when operating as a three-element torque converter, the core and the space between the lines 257 and 258 are substantially empty while the spaces between the stator vanes 92 are filled or nearly filled, as is also the space between the impeller and the rotor veins, except as above stated. But when operating as a two-element flywheel the space between the stator vanes 92 is substantially empty and the above-mentioned spaces become nearly filled.

I might here explain that fluid enters the core at the joint 259 by centrifugal force, and exits at 260 only when the passages at 237 and 238 are not full.

Attention is called to the apparent widening of the passages (axially of the unit) as they approach the main axis. As shown in Figure 8 the passages are of uniform area or approximately uniform area in cross section. The widening of the passages between the vanes as they approach the center axis is, or is intended to be, proportional to the shortening of the annular dimension at the radial points under consideration. It is apparent that the angular or circumferential distance between the vanes decreases as the center axis is approached. In order to provide fluid passages of uniform area, I have widened the passages in the direction normal to the annular widths, i. e. in the direction of the axis, as shown in Figure 8. The widening takes place uniformly in such a manner as to make the cross section or capacity of the passages of substantially constant size.

In the illustrated construction, however, I have included the following modification: Taking the passages between the impeller blades at 237 (Figure 8) as 100% in size I have made the passage 238 110%, the passage 240 102%, the passage 241 112%, passage 242 106%, and the passage 243 112%, in cross sectional area. Passage 239 is 104% and passage 244 is 112%. These small differences do not show up plainly in the small scale drawings suitable for patent purposes. By this method, however, I accomplish the following: First, a substantially uniform cross sectional area of the passages; second, passages increasing slightly in area to compensate for the loss of circulating velocity due to friction; third, passages having somewhat larger entrance openings than the preceding exit openings.

Figures 11 to 15 are diagrammatic illustrations of my impeller vane construction but showing in detail a further modification. I have here shown the impeller blades 53 the same as in the modifications already described, and other parts bear the same reference character as previously used. However, in this figure I have introduced auxiliary impeller blades 275. These blades 275 are securely fastened at their inner ends to the main impeller blades 53 whereas their outer ends are free to move circumferentially in openings 237. The outer ends of the auxiliary blades 275 are pivotally secured to an outer ring 276 by means of pivots 277.

In addition to the natural spring of the auxiliary blades 275 a coiled spring 278 shown in Figures 14 and 15 is located in the core 254, one end of which is secured at 279 to the core 254 whereas the other end of spring 278 is secured to a lug projecting inwardly from the annular ring 276 at 280. A suitable stop 281 is secured to the core 254 to limit the peripheral movement of ring 276 in one direction. As shown in Figure 11 the auxiliary blades 275 are normally yieldingly held in their normal positions by the above-described spring means. By means of these yieldable auxiliary impeller blades 275 I direct the circulating flow of the fluid back against the direction of revolution indicated by the arrow in Figure 11.

By this means, at slow speeds little or no force is imparted to the rotor blades. In fact, a slight tendency to revolve in the reverse direction can be produced if desired. Since it is desirable to shift the transmission into different positions at low speeds only, it is at low speeds only that I desire to impart little or no motion to the rotor members. As the speed of the impeller is increased, the velocity pressure of the fluid forces the auxiliary blades 275 back against the main impeller blades 53 as shown in Figure 12. When held in this position the impeller blades function in the manner previously described just as though there were no auxiliary blades 275. The natural action of centrifugal force on the auxiliary blades 275 tends to return them to the position shown in Figure 12; i. e., centrifugal force assists the velocity pressure in returning the auxiliary blades 275 to the operating position shown in Figure 12.

Figure 22:
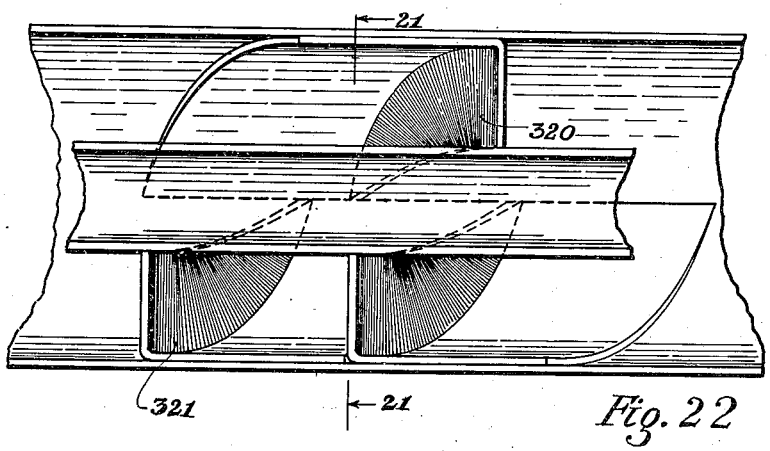
Figure 22 is an enlarged developed view looking radially into the stator element with the buckets shown in Figure 18 clustered.
Figure 23:
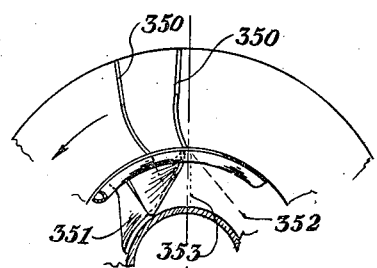
Figure 23 is a diagrammatic view showing the angular arrangement of the rotor blades with respect to the stator blades.

In Figures 9, 22 and 23 I have shown my stator vanes and their arrangement. The angular advance of the fluid caused by the stator vanes amounts to the angular change caused to take place between the entering column of fluid and the existing column of fluid, and will, of course, cause a counter torque on the stator, equal to the output torque less the input torque. The angle of exit from the stator vanes to the impeller vanes is such as will deliver fluid to the impeller at an annular velocity and angle approximately equal to or greater than the annular velocity of the impeller. In some cases my impeller vanes are shaped to receive rotative impetus from the fluid coming off the stator vanes.

Figure 16 shows a modification which is very similar to that of Figure 8. In Figure 16 I illustrate how the impeller, rotor, and stator vanes may be constructed from sheet metal stampings spot welded or otherwise secured in place as indicated. Spot welds are indicated at points 300 while arc welds are indicated at points 301. As shown at 300 the blades are provided with suitable tongue members extended to be parallel with the respective housings into which the vanes are to be secured. Figure 16 also shows an enlarged view of the central portion of Figure 3, including the hexagonal wedge-ended rod 140, the lock pins 141, the oil passage 161, etc.

Figure 16 also illustrates the fact that the tortuous path of the fluid between the stator blades, and the reduced effective cross section of the outlets caused by the angle of discharge, sets up a substantial resistance to the flow of the liquid through the stator. Part of the velocity pressure prevailing in the rotor is therefore converted into pressure head to force fluid through the stator. During this conversion a part of the fluid loses its velocity, and may take the shorter path direct from the rotor to the impeller.

In Figure 16 there is illustrated the arrangement of fluid intake passages 163 through the rotor vanes (or tubes carried by the rotor vanes) to a low-pressure central point just inside the core; this arrangement of the intake passages 163 is also shown in Figure 3. The impeller housing 302 is extended down to seal against the hub 302' of the stator housing 93. There is a substantial fluid pressure along the walls of the vortex, and therefore at the joint 303 between the impeller and the stator, so that fluid tends to discharge at 303 under considerable pressure. Vanes or blades 303' may be placed on the impeller housing 302 to build up a centrifugal pressure against which this discharge pressure must work.

This increases the pressure against which discharge must take place, having the effect of maintaining a larger volume of fluid in the vortex. The amount of the fluid in the vortex can therefore be controlled by varying the centrifugal head against which the discharge takes place. As one illustrative means of adjustably controlling the centrifugal head, I show in Figure 16, a gooseneck tube 304 adjustable about an axis 305 to change the effective radial position of its outlet 306, thereby varying the effective centrifugal head in the annular chamber 307. In some cases the tube 304 may be fixed in position (in which case a drilled passage may be substituted for it if desired), or means may be provided in other cases for changing its angular position while running.

Figure 17 shows a construction somewhat similar to that of Figure 16, but in which the auxiliary vanes 275 described above in connection with Figure 11 are used, together with the spring 278 and the annular ring 276. The vanes in Figure 17, like the vanes in Figure 16, are made up of sheet metal stampings suitably secured in place. However, I have in Figure 17 introduced a somewhat different vane design. In this figure the vane areas and lengths bear a modified relation to each other as compared with the previous figures. In Figure 17 it will be seen that each of the impeller vanes 310 extends inwardly toward the center considerably beyond the corresponding rotor vane 311. It will also be noticed that the impeller vane 310 is considerably wider at its central portion than the width of the rotor vane 311. This increases the centrifugal force imparted to the fluid by the impeller vanes over and above the counter force imparted to the fluid by the rotor vanes 311. In this way I am enabled to increase the rate of circulation when the rotative speed of the rotor reaches more nearly the rotative speed of the impeller. This enables my hydraulic vortex mechanism to transmit an increased torque load at the ratios more nearly approaching a one-to-one drive than can previous hydraulic vortexes.

Figure 18:
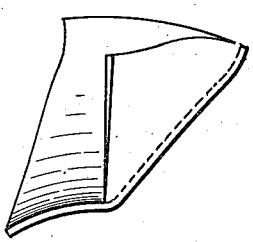
Figure 18 is a perspective view of a stamped bucket, a cluster of which may form the blades of the stator of the hydraulic vortex in one form of construction.

Figure 18 is a perspective view of a stamped vane or bucket, a cluster of which may form the blades or vanes of the stator member of my hydraulic vortex in any one of its alternative forms. This vane or bucket is so constructed that a portion of its sides practically form the stator shell when a series of them is secured together. The stator blade or vane so formed is unlike previous stator blades in that the blade is not one continuous blade from the inlet to the outlet but is in the form of two half blades. These buckets may be arranged so that the half blades meet edge to edge at the center line to form one continuous blade, or they may be arranged staggered so that the column of fluid entering between the first half of the blades is parted by the second half of the blades, thus forming a new column of fluid of the same size from two fractions of adjacent entering columns.

Figure 19:
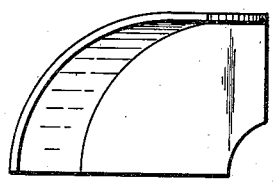
Figure 19 is a projected view of Figure 18.
Figure 20:
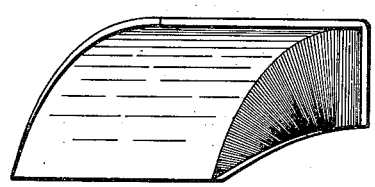
Figure 20 is a projected view of Figure 19.
Figure 21:
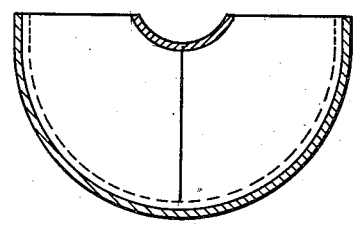
Figure 21 is a sectional view along the line 21—21 of Figure 22.

Figure 18 is a perspective view showing the entering bucket 320 in Figure 22. The discharge bucket 321 may be similar or identical in construction, but turned in the opposite direction as shown in Figure 22. Figure 19 is a top view looking down on the bucket of Figure 18. Figure 20 is an end view projected from Figure 19. Figure 21 is a cross section along line 21—21 of Figure 22. Figure 22 is a developed top view showing the arrangement of the buckets, the curvature about the main axis being omitted. These figures merely show one preferred form of constructing the stator blades from stampings. In a somewhat similar manner the impeller blades and rotor blades may be constructed of stamped buckets adapted to be secured together to form or help to form the impeller assembly or the rotor assembly.

Figure 23 is a diagrammatic illustration showing the angular arrangement of the rotor blades with respect to the stator blades. The rotor blades are indicated at 350 whereas the stator blade may be one of the buckets shown in Figure 18 and is indicated at 351. The direction of the flow of the fluid off of the blades 350 may be in the direction of the dotted line 352, but due to the revolution of the rotor in the direction of the arrow the resultant velocity will be in the direction of the dotted line 353. Different resultant velocities of fluid from the rotor blades 350 will lie some place between the dotted lines 352 and 353. Fluid will impinge against the helical curved surface of the rotor blade 351 at some angle between dotted lines 352 and 353. The angular arrangement and curvature of the blades 351 is such as to accommodate different ranges of angular approach to the best advantage.

In Figure 24 I have shown the upper half of a radial section of my hydraulic torque converter in a form similar to those already described. However, in this view I have introduced two friction clutches and a tooth brake, all of which are automatically actuated. The first clutch 465 when engaged attaches an impeller assembly 466 to a flywheel housing 467, causing the impeller assembly 466 to turn with the flywheel housing 467. By means of weighted levers 468 suitably pivoted on the flywheel housing 467 at 469, the friction disc clutch 465 is engaged by centrifugal force acting on the weights 470, when the rate of revolution of the flywheel is sufficient to cause enough centrifugal action on weights 470 to overcome torsion springs 471. Until such speed is reached the friction disc clutch 465 remains disengaged, thereby imparting little or no rotative force to the impeller assembly 466.

A second friction clutch 475 is normally disengaged and is yieldingly held so by means of a helical spring 476. However, when the rate of revolution of both the impeller assembly 466 and the rotor assembly 477 becomes sufficiently high so that the hydrostatic pressure of the fluid between them tends to separate the impeller shell 467 and the rotor shell 477, the spring 476 becomes compressed thus allowing the friction discs of the clutch 475 to become engaged, thus effecting a one-to-one drive between the flywheel 478 and rotor assembly 477. The movement of the rotor stem 479 and the rotor assembly 477 just described will cause the stator shell 480 to move toward the flywheel, motion being imparted through a thrust bearing 481 from the rotor stem 479 to the stator shell 480. This movement will cause the disengagement of a tooth brake 482, thus allowing the stator shell 480 to revolve at will whereas when the tooth brake 482 is engaged the stator shell 480 is held against movement by the stationary transmission housing 483. Spring 484 is introduced to normally maintain a clearance at the joint 485. By these means I provide an automatically operated friction clutch for connecting and disconnecting the impeller from the prime mover, an automatically actuated friction clutch for connecting and disconnecting the prime mover from the rotor at desired speeds, and automatic means for connecting and disconnecting the stator from a fixed member.

In all forms of my novel torque converter I prefer to provide the three elements with different numbers of blades or vanes, the numbers preferably being prime to each other. Thus there is at any given instant only one blade on each element crossing a single blade on one of the other elements. Moreover, the crossing of the blades occurs so frequently that it is practically continuous. By using prime numbers of blades, also, the rhythm set up is of a period least apt to harmonize with the natural period of the other moving parts.

Figure 25 shows an outside elevation of a transmission such as the one shown in Figure 1, with a preferred form of operating hook-up. The shift lever pivot 68 of Figure 1 and of Figure 25 are the same in construction and operation; however, in Figure 25, the angular location of this pivot is swung around 90° from the position shown in Figure 1. The lever 480 turns the pivot shaft 68, effecting a shift as previously described under Figure 1. Normally the lever 480 is moved by means such as a hand shift lever 481. In addition I provide suitable connecting links 482 and 483 and a lever 484 embodying a one-way slip joint 485. When the clutch pedal 486 is depressed all the way, the last inch or so of movement causes the lower end of lever 484 to strike an adjustable abutment 487 on the rod 482 and move the rod 482 aft or to the right, thereby causing the shaft 68 to turn to a position causing the transmission parts to move into their neutral position at the time the pedal 486 strikes the toe board or a suitable stop (not shown). In this way I provide means for completely disconnecting all driving means from the driven means, and this means is operated by a movement which is now instinctive to experienced drivers of present day automobiles. This is an emergency measure, on such rare occasions as when an automobile engine jams or locks while the automobile is traveling at a high rate of speed, when it becomes desirable quickly and completely to disconnect the engine from the driven shaft.

In Figure 26 I show diagrammatically an alternative means for interconnecting with the transmission the hand brake lever 491, so that either the clutch may be disengaged or the shift lever moved to neutral when the hand brake is applied. Due to the curvature of a slot 490 the hand brake lever 491 may be moved to any degree desired. On the other hand there is a cross slot 492 permitting the lever 493 to move to any degree within its limits when the hand brake lever is in its disengaged position. But when the hand brake lever is moved to the position to apply the brakes, the lever 493 will be engaged and moved to a definite position by the hand lever 491, the lever 491 having for that purpose an extension or boss 294 which finds its way into the slot 490 and which moves therein. Now by suitably connecting the end 495 of the lever 493 to either the clutch or the shift mechanism they may be brought to a desired definite position when the hand brakes are applied.

In Figure 27 I have shown diagrammatically a hook-up actuated by the brake pedal 497, to close the engine throttle when the brake pedal is depressed. This is a precautionary measure to insure the closing of the throttle when foot brake is applied, should the foot accelerator mechanism stick. Since my transmission is automatic I desire to eliminate the likelihood of the engine turning too fast and causing an intermediate speed tending to drive the car when the brakes are applied. Should such a thing happen the engine and transmission would tend to drive the car while the operator was trying to stop the car, thus prolonging the stopping distance and time.

I accomplish this by introducing means such as a bell crank lever 498 with an end extended to engage the pedal 497. By means of a one-way slip joint a rod 499 is caused to move aft or to the right, when pedal 497 is depressed. Rod 499 may be connected by suitable yielding means (not shown) to the accelerator rod or to the throttle rod (not shown) to cause them to move to close the throttle to idling position.

The transmission shown in Figure 28 includes a turbine unit 501 driving, through a series-multiple connection, a planetary gear unit 502. The turbine unit includes a vaned impeller 503 bolted or otherwise secured to a housing or flywheel carried by the end of the driving shaft 519, a vaned rotor or impelled member 504, and a vaned stator or reactance member 505, all axially arranged.

The gear unit 502 includes a first sun gear 506 driven by and rotatable with and at the speed of the impeller 503, a first set of planet gears 507 meshing with the sun gear 506, and a gear carrier 508 for the planet gears 507.

There is also a second sun gear 509 rotatable with and at the speed of and driven by the fluid-propelled rotor 504, a second set of planet gears 510 meshing with the second sun gear 509, and a ring gear 511 meshing with the planet gears 510 and having a one-way reactance device 512 of the type described and claimed in my application No. 468,786, filed July 18, 1930 now matured into Patent No. 2,007,442. The reactance device 512 prevents rotation of the ring gear 511 in one direction but permits it to turn in the other direction.

The gearing also includes a second gear carrier 513 for the planet gears 510, and carrying rigid therewith a second ring gear 514 meshing with the planet gears 507. A contracting band brake 515 is provided for holding the gear carrier 513 against rotation when desired (e. g. for reverse drive), while an axially-shiftable driven member 516 is provided with a clutch having teeth engageable selectively with corresponding teeth either on the gear carrier 508 or on an extension 523 of a housing bolted to the ring gear 511, for forward and reverse drive.

A one-way reactance device 517 is provided for holding the reaction or stator member 505. Suitable fluid passages 518 are provided for maintaining a supply of fluid in the turbine unit 501. The illustrated reaction device 517 is more fully described, and is claimed, in my application No. 525,968, filed March 28, 1931 now matured into Patent No. 1,959,349.

In forward drive, the clutch member 516 is connected to the gear carrier 508, and the one-way reaction device 512 is set as described in Patent No. 2,007,442 to prevent reverse rotation of the ring gear 511, while permitting it to turn in a forward direction. Rotation of the power shaft 519 drives the impeller 503, as well as the sun gear 506, causing power to be supplied to the driven member 508—516 through two paths in parallel or multiple. If a positive low gear drive is desired at the start, the brake member 515 may be engaged to hold the ring gear 514 against rotation in the reverse direction. Upon release of this brake member the hydraulic torque converter will operate automatically to vary the driving ratio through an infinite number of steps in accordance with speed and torque conditions.

One path is from the drive shaft 519, through a central shaft 520 rigidly connected thereto, to the sun gear 506 keyed on the shaft 520, thence to the planet gears 507 and through those gears to the gear carrier 508 on which they are mounted. The other path is from the drive shaft 519 through the impeller 503, and in cooperation with the reaction member or stator 505 driving the driven member or rotor 504, thence through a sleeve 521 to the sun gear 509 keyed thereon and to the planet gears 510 meshing therewith, from the planet gears to the ring gear 514, and then through the planet gears 507 to the gear carrier 508.

Since the ring gear 511 is held against reverse rotation, by means such as the reactance member 512, it may absorb a considerable part of the torque load, thus preventing over-loading the turbine unit. With the proportions illustrated, the reaction load on the fluid turbine unit is approximately one-third of what would be imposed on it if the gears 509, 510, and 511 were omitted and the sleeve 521 connected directly to the ring gear 514.

For reverse, the clutch member 516 is shifted to connect it to the member 523 (and therefore to the ring gear 511), the reaction member 512 is placed in neutral or reverse, and the brake 515 is set to hold the gear carrier 513 stationary. With this setting, the entire power for reverse is sent through the hydraulic turbine unit, the sun gear 506 and the gears 507 and ring gear 514 turning idly without driving. Power goes from the shaft 519, through the turbine members 503, 505, and 504, thence through the sleeve 521, sun gear 509, and planet gears 510, to the ring gear 511. Since the gear carrier 513 is held against rotation, the ring gear 511 (and therefore the driven member 516) is driven in a reverse direction at a reduced speed.

Suitable anti-friction bearings 522 may be provided for the rotating parts. The connection between the ring gear 511 and the extension 523 is shown as a bell housing 524 inclosing the other gears.

The reactance member 517, as described in Patent No. 1,959,349, enables member 505 to start rotating and pick up speed gradually until it finally turns as a unit at high speeds with the turbine members 503 and 504.

The reaction member 512 may act as an impulse rectifier for alternating positive and negative impulses, if the planet gears 510 are counterweighted as shown on one side. In this case the positive impulses drive the ring gear 511 and the negative impulses are held by the member 512. The rectified positive impulses give a second torque amplification in series with the hydraulic torque amplifier, driving the ring gear at an increasing intermediate speed until a one-to-one direct high drive is reached with the weighted pinions 510 in effect locking the rotor 504 to the ring gear 514.

Thus in this modification there is a positive low gear, all of the drive then being from the sun gear 506, followed by an automatic infinitely variable intermediate speed drive, and finally a direct one-to-one high speed drive.

In all of the above-described modification advantage is taken of the most effective range of speeds of a hydraulic torque converter, there is a positive geared low speed, there may if desired be a positive lock connecting all of the parts to turn as a single unit in a direct drive at high speed, and reverse is secured without the addition of extra mechanism.

Figure 29:
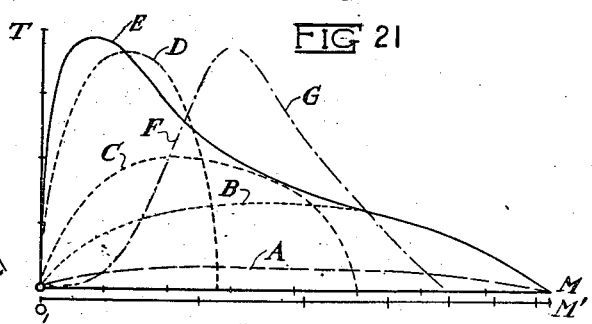
Figure 29 is a diagram illustrating a comparison of the characteristics of my transmission with those of a standard three-speed transmission of the type now generally used.

Some of the advantages of my transmission are illustrated in Figure 29. In all transmissions, it is desirable to balance engine torque and speed against the required output torque to produced maximum acceleration at the given engine speed, or (with wide open throttle) to give the maximum speed of which the engine torque curve is capable. This desirable characteristic is attained by my transmission, as described above, more exactly than with any previous transmission that I know of.

In the diagram of Figure 29, the ordinates in the direction of OT indicate output torque, along the abscissa OM are plotted car speed, and along the parallel line O'M' are plotted elapsed time. The dashed line A indicates useful available engine torque. The dotted line B is a plot of the useful engine torque A multiplied by the rear axle ratio.

The line C is a plot of the useful engine torque ($a$) multiplied by the rear axle ratio (as in B) and by the second gear ratio of a standard three-speed automobile transmission, while the line D is a similar plotted line for low gear. The full-line curve E shows car performance at wide open throttle (with the same rear axle ratio as before) with my improved transmission herein described.

By way of additional comparison, curves F and G illustrate the characteristics of an ordinary torque converter of the three element type when used above, i. e. when not arranged in my novel combination series-multiple arrangement with a planetary gear or the like. The curve F is plotted on the ordinate OT and the lower abscissa O'M' (i. e. it is a time characteristic), and the curve G is plotted on OT and OM, as unlike the cases previously discussed the curves are in this case different for the two abscissae.

Comparison of the curve E with the other curves shows how my use of a positive geared low drive gives a very rapid rise to maximum torque amplification at low gear, in starting, followed by successive positions substantially tangent to the curves D and C until high gear is reached, and then coincident with curve B. In other words, the curve E of my transmission is substantially the curve obtainable if there were an infinite number of gear changes with individual curves like D and C, and the driver were able to shift from each one to the next at exactly the most favorable instant.

Due partly to this favorable characteristic, and partly to the quietness with which my transmission operates, it is feasible to use a much lower gear ratio than usual in the rear axle, as there is no objection to driving in intermediate gear at much higher speeds than usual, so that at high speeds the engine turns more slowly than in cars equipped with conventional transmissions. The advantages of this are too well known to require discussion herein.

While several illustrative embodiments have been described in detail, it is not my intention to limit the scope of the invention to those particular embodiments, or otherwise than by the terms of the appended claims. Part of the subject-matter disclosed and claimed herein is continued from my prior application No. 646,777, filed December 12, 1932, now matured into Patent No. 2,003,108.

I claim:

1. A parallel series variable speed transmission comprising a turbine unit and a gear unit, said turbine unit comprising a vaned fluid-propelling member, a vaned fluid-propelled member and a vaned fluid-reactance member, said three members being coaxial, said gear unit comprising a first gear connected to rotate with and at the speed of the fluid-propelling member, a second gear connected to rotate with and at the speed of the fluid-propelled member, and a member driven by both gears.

2. A parallel series variable speed transmission comprising a turbine unit and a gear unit, said turbine unit comprising a vaned fluid-propelling member, a vaned fluid-propelled member and a vaned fluid-reactance member, said three members being coaxial, said gear unit comprising a first gear rotatable with and at the speed of the fluid-propelling member, a second gear rotatable with and at the speed of the fluid-propelled member, a planet gearing meshing with said second gear, a gear meshing with said planet gearing and held against reverse rotation, a gear carrier for said planet gearing, and a member driven both by said first gear and by said gear carrier.

3. A parallel series variable speed transmission comprising a turbine unit and a gear unit, said turbine unit comprising a vaned fluid-propelling member, a vaned fluid-propelled member and a vaned fluid-reactance member, said three members being coaxial, said gear unit comprising a first sun gear rotatable with and at the speed of the fluid-propelling member, a first planet gearing meshing with said first sun gear, a first gear carrier for said planet gearing, a second sun gear rotatable with and at the speed of the fluid-propelled member, a second planet gearing meshing with said second sun gear, a first ring gear meshing with said second planet gearing, selective means for holding said ring gear against rotation, a second gear carrier for said second planet gearing, a second ring gear rotatable with and at the speed of said second gear carrier and meshing with said first planet gearing, selective means for holding said second gear carrier against rotation for reverse drive, a driven member, means for selectively connecting said driven member to rotate either with said first gear carrier or with said first ring gear, and a reversible one-way reactance for controlling said second ring gear.

4. A parallel series variable speed transmission comprising a turbine unit and a gear unit, said turbine unit comprising a vaned fluid-propelling member, a vaned fluid-propelled member and a vaned fluid-reactance member, said three members being coaxial, said gear unit comprising a first sun gear rotatable with and at the speed of the fluid-propelling member, a first planet gearing meshing with said first sun gear, a first gear carrier for said planet gearing, a second sun gear rotatable with and at the speed of the fluid-propelled member, a second planet gearing meshing with said second sun gear, a first ring gear meshing with said second planet gearing, selective means for holding said ring gear against rotation, a second gear carrier for said second planet gearing, a second ring gear rotatable with and at the speed of said second gear carrier and meshing with said first planet gearing, selective means for holding said second gear carrier against rotation for reverse drive, a driven member, and means for selectively connecting said driven member to rotate either with said first gear carrier or with said first ring gear.

5. A parallel series variable speed transmission comprising a turbine unit and a gear unit, said turbine unit comprising a vaned fluid-propelling member, a vaned fluid-propelled member and a vaned fluid-reactance member, said gear unit comprising a gear member rotatable with and at the speed of the fluid-propelling member, a gear member rotatable with and at the speed of the fluid-propelled member, a series of gear members drivably connected with both said gear members, one of said series tending to rotate in one direction and another in the opposite direction, a driven shaft, and means for selectively connecting said shaft with one of said members for rotation in one direction or with the other member for rotation in the opposite direction.

6. A parallel series variable speed transmission comprising a turbine unit and a gear unit, said turbine unit comprising a vaned fluid-propelling member, a vaned fluid-propelled member and a vaned fluid-reactance member, said gear unit comprising a gear member rotatable with and at the speed of the fluid-propelling member, a gear member rotatable with and at the speed of the fluid-propelled member, a member driven by both of said gear members in one direction, and a member driven by the last named gear member only in the opposite direction.

7. A parallel series variable speed transmission comprising a turbine unit and a gear unit, said turbine unit comprising a vaned fluid-propelling member, a vaned fluid-propelled member and a vaned fluid-reactance member, said gear unit comprising a gear rotatable with the fluid-propelling member, a planetating gear meshing with said gear and a second gear meshing with said planetating gear, a gear rotatable with the fluid-propelled member, a planetating gear meshing with said gear, and a ring gear meshing with the planetating gear, said last named planetating gear being drivably connected to the said second gear, and a driven member selectively connectable to said ring gear or said first named planetating gear.

8. A transmission comprising a driving member, a driven member, an automatic hydraulic variable speed unit, said unit including a driving element, a driven element and a reactance element providing a fulcrum for torque multiplication, a differential gear set, the driving member being drivably connected to both the hydraulic unit and the gear set, a second driving connection between said hydraulic unit and the gear set, a driving connection between the gear set and the driven member, and means for changing said driving connections to reverse the direction of the driven member.

9. A transmission comprising a drive shaft, a hydraulic drive unit including a vaned impeller connected to the shaft, a vaned rotor and a vaned stator, a gear driven by said shaft, planetary gearing having one part driven by said gear and another part driven by said rotor and having a driven part operated by the joint action of the gear and said unit, and means preventing reverse rotation of the part driven by said rotor, whereby at low speed said unit runs idly and the driven part is positively driven at a positive low speed by said gear.

10. A transmission comprising a drive shaft, a hydraulic drive unit and a gear both driven by said shaft, planetary gearing having one part driven by said gear and another part driven by said unit and having a driven part operated by the joint action of the gear and said unit, and means separate from said unit preventing reverse rotation of the part driven by said unit, whereby at low speed said unit runs idly and the driven part is positively driven at a positive low speed by said gear, in combination with centrifugal means for locking the parts of the hydraulic drive unit mechanically together at high speeds, to give a direct one-to-one drive at high speeds.

11. A transmission comprising drive means, hydraulic driving means and mechanical driving means both driven by said first means, mechanism driven by the joint action of the hydraulic and mechanical means, and means separate from the hydraulic means preventing reverse rotation of the part of the mechanism driven by the hydraulic means, whereby at low speed said hydraulic means has no driving action and said mechanism is positively driven at a positive low speed by said mechanical means, in combination with centrifugal means for locking the parts of the hydraulic driving means mechanically together at high speeds, to give a direct one-to-one drive at high speeds.

12. A transmission comprising a drive shaft, a hydraulic drive unit and a gear both driven by said shaft, said unit including a driving element, a driven element and a reactance element providing a fulcrum for torque multiplication, planetary gearing having one part driven by said gear and another part driven by said unit and having a driven part operated by the joint action of the gear and said unit, and means preventing reverse rotation of the part driven by said unit, whereby at low speed said unit runs idly and the driven part is positively driven at a positive low speed by said gear, in combination with manually controlled means for changing the connections to said planetary gearing to give a reverse drive.

13. A transmission comprising a driving shaft, a hydraulic driving element and a mechanical gear mounted on and spaced apart axially of said shaft and connected to said shaft to be driven thereby, planetary gearing having one element driven by said gear, means including a manually-operable clutch in the space between said gear and said hydraulic element and through which said hydraulic element drives another element of the planetary gearing, and driven means driven through said planetary gearing jointly by the hydraulic element and said gear.

14. A transmission comprising a driving member and a driving shaft arranged coaxially thereof, a wrapping spring clutch element for gradually and yieldingly coupling said member and said shaft under load, a hydraulic torque converter driven by said driving member independently of said clutch element, a mechanical gear driven by said shaft, and driven means driven jointly by said torque converter and said gear.

15. A transmission comprising planetary gearing including a sun gear and a ring gear and pairs of inter-meshing planet gears mounted on a gear carrier and driven by the sun gear and driving the ring gear in the same direction as the sun gear, and a hydraulic torque converter drivably connected to an element of the gearing other than the sun gear and cooperating with the sun gear to drive said planetary gearing.

16. A transmission comprising planetary gearing including a sun gear and a ring gear and pairs of inter-meshing planet gears mounted on a gear carrier and driven by the sun gear and driving the ring gear in the same direction as the sun gear, a hydraulic torque converter drivably connected with the gear carrier, and a driven shaft drivably connected with the ring gear.

17. A transmission comprising a drive shaft having a hydraulic torque converter drivably mounted thereon at one end and having a driven shaft arranged in alinement therewith at the other end, a planetary gear unit drivably connected to said drive shaft and axially shiftable thereon, connections rendered effective by shifting said unit to one position for connecting one part of the planetary unit to the hydraulic torque converter and another part to the driven shaft for driving said driven shaft in one direction by the joint action of said torque converter and of said drive shaft acting directly on the planetary unit, and other connections rendered effective by shifting the planetary unit to another position for holding one part of said unit stationary and driving said driven shaft in the opposite direction at low speed by the direct action of the drive shaft independently of the hydraulic torque converter.

18. A transmission comprising a drive shaft having a hydraulic torque converter drivably mounted thereon at one end and having a driven shaft arranged in alinement therewith at the other end, a planetary gear unit drivably connected to said drive shaft and axially shiftable on said shaft, connections rendered effective by shifting said unit to one position for connecting one part of the planetary unit to the hydraulic torque converter and another part to the driven shaft for driving said driven shaft in one direction by the joint action of said torque converter and of said drive shaft acting directly on the planetary unit, and other connections rendered effective by shifting the planetary unit to another position for holding one part of said unit stationary and driving said driven shaft in the opposite direction at low speed by the direct action of the drive shaft independently of the hydraulic torque converter, said unit being shiftable to a third "neutral" position in which it is disconnected from both the torque converter and the driven shaft.

19. A transmission comprising a drive shaft having a hydraulic torque converter drivably mounted thereon at one end and having a driven shaft arranged in alinement therewith at the other end, said torque converter including a driving element, a driven element and a reactance element providing a fulcrum for torque multiplication, a planetary gear unit drivably connected to said drive shaft, connections for drivably connecting one part of the planetary unit to the hydraulic torque converter and another part to the driven shaft for driving said driven shaft in one direction by the joint action of said torque converter and of said drive shaft acting directly on the planetary unit, and other alternatively-effective connections for holding one part of said unit stationary and driving said driven shaft in the opposite direction at low speed by the direct action of the drive shaft independently of the hydraulic torque converter, and manual means for selectively rendering either of said connections effective or for disconnecting said unit from both the torque converter and the driven shaft to give "neutral."

20. A transmission comprising a drive shaft having a hydraulic torque converter drivably mounted thereon at one end and having a driven shaft arranged in alinement therewith at the other end, a planetary gear unit drivably connected to said drive shaft and axially shiftable on said shaft, connections rendered effective by shifting said unit to one position for connecting one part of the planetary unit to the hydraulic torque converter and another part to the driven shaft for driving said driven shaft in one direction by the joint action of said torque converter and of said drive shaft acting directly on the planetary unit, and other connections rendered effective by shifting the planetary unit to another position for holding one part of said unit stationary and driving said driven shaft in the opposite direction at low speed by the direct action of the drive shaft independently of the hydraulic torque converter, said unit having two forward-drive positions, in one of which there is a free-wheeling forward drive and in the other of which there is a positive forward drive.

21. A transmission comprising a shaft, a hydraulic torque converter mounted on the shaft, and a planetary unit driven jointly by said converter and said shaft and including pairs of intermeshing gears and parts cooperating with said gears to form gear pumps to circulate lubricant to the parts of the transmission and to said converter to serve as a driving fluid therefor.

22. A transmission comprising a shaft, a hydraulic torque converter mounted on the shaft, and a planetary unit driven jointly by said converter and said shaft and including pairs of intermeshing gears and parts cooperating with said gears to form gear pumps to circulate driving fluid to said converter.

23. A transmission connecting a driving member to a driven member comprising a gear train having a plurality of elements, means connecting one of said elements to the driven member, means connecting another of said elements to the driving member and a hydraulic variable speed torque-multiplying unit connecting the driving member to a third of said elements to drive it in the same direction as and at a speed approaching the speed of the driving member, said gear train being so constructed and so connected to the unit that reaction torque on the driven shaft tends to turn it in a direction opposite to that in which it is turned by the driving member.

24. A transmission connecting a driving member to a driven member comprising a gear train having a plurality of elements, means connecting one of said elements to the driven member, means connecting another of said elements to the driving member and means connecting the driving member to a third of said elements, said last means comprising a vaned impeller connected to the driving member, a vaned rotor connected to said third element and a vaned stator, said impeller driving the rotor in the same direction in which it is rotating.

25. A transmission connecting a driving member to a driven member comprising a gear train, one element of which is connected to the driven member and another element to the driving member, and hydraulic torque-multiplying means connecting the driving member to a third element of the gear train and including an impeller turning with and at the same speed as the driving member, a stator forming a fulcrum for torque multiplication, and a rotor connected to said third element and driving it in the same direction as and at a speed not greater than the speed of the driven member.

26. A transmission connecting a driving member to a driven member comprising a gear train, one element of which is connected to the driven member and another element to the driving member, and hydraulic torque-multiplying means connecting the driving member to a third element of the gear train said hydraulic means including vaned impeller, rotor and stator elements forming confined fluid passages in which fluid is circulated in such a manner that velocity of the fluid is converted into pressure and vice versa to drive the rotor.

27. A transmission connecting a driving member to a driven member comprising a gear train having an element connected to the driven member and another element to the driving member and so constructed and arranged as to multiply torque received from the driving member and transmit it to the driven member, a vaned impeller connected to the driving member, a vaned stator, and a vaned rotor connected to a third element of the gear train to drive the same at varying speeds and torques.

28. A variable speed transmission comprising a hydraulic torque converter having a vaned fluid-propelling member, a vaned fluid-propelled member and a vaned fluid reactance member, said three members being coaxial, and a differential gear unit having a first element connected to and rotatable with the fluid-propelling member, a second element connected to and rotatable with the fluid-propelled member, and a third element driven jointly by said first and second elements.

29. A variable speed transmission comprising a hydraulic torque converter having a vaned fluid-propelling member, a vaned fluid-propelled member and a vaned fluid reactance member, said three members being coaxial, and a planetary gear unit having a sun gear drivably connected to said fluid-propelling member and having a ring gear element and a gear carrier element, and means for connecting one of said elements to the fluid propelled member, the other of said elements being driven jointly by said sun gear and said one element.

30. A variable speed transmission comprising a planetary differential gear set with its reactance member or ring gear fixed, a second planetary differential gear set, and a variable speed hydraulic unit including a driving member, a driven member and a reactance member, and a drive shaft, said drive shaft being connected to the driving gear of the second differential gear set and also connected to the driving member of the variable speed unit, the driving member of the first differential gear set being connected to the reactance member of the second differential gear set, and the driven member of the variable speed unit being connected to the driving member of the first differential gear set.

31. A variable speed transmission comprising a plurality of differential gear sets and a torque responsive variable speed unit, one of the differential gear sets having a reactance gear for the purpose of absorbing a greater portion of the reaction due to the increase in torque, the torque responsive variable speed unit having a reaction absorption element absorbing a lesser portion of the reaction due to the increase in torque, an overrunning reaction member for the torque responsive variable speed unit, and an overrunning clutch for securing the reactance gear of the gear set against rotation in one direction, the other one of the differential gear sets and the torque responsive unit being arranged in driving relation to different parts of said one gear set other than the fixed reactance gear.

32. A parallel series variable speed transmission comprising a turbine unit and a gear unit, said turbine unit comprising a vaned fluid-propelling member, a vaned fluid-propelled member and a vaned fluid-reactance member, said three members being coaxial, said gear unit comprising a first sun gear connected to and rotatable with and at the speed of the fluid-propelling member, a first planet gearing meshing with said first sun gear, a first gear carrier for said planet gearing, a second sun gear connected to and rotatable with and at the speed of the fluid-propelled member, a second planet gearing meshing with said second sun gear, a first ring gear meshing with said second planet gearing, means for holding said ring gear against rotation in one direction, a second gear carrier for said second planet gearing, and a second ring gear connected to and rotatable with and at the speed of said second gear carrier and meshing with said first planet gearing.

33. A variable speed transmission for connecting a driving shaft to a driven shaft comprising a differential gear set having one element connected to the driving shaft and another element connected to the driven shaft, and a hydraulic torque multiplying unit having a vaned stator and vaned driving and driven members and means connecting one of said members to one of said shafts and the other of said members to a third element of said gear set, said gear set being so constructed and so connected to the unit that reaction torque on the driven shaft tends to turn said other of the members in a direction opposite to that in which it is normally turned by the action of the driving shaft.

34. A transmission connecting a driving member to a driven member comprising a gear train having a plurality of elements, means connecting one of said elements to the driven member, means connecting another of said elements to the driving member, and a variable speed hydraulic unit including a fluid propelled member, a fluid propelling member, a member forming a fulcrum for torque multiplication, and means for holding said last named member against rotation whereby it can act as a fulcrum, said unit connecting the driving member to a third of said elements to drive it in the same direction and at a torque greater than the torque of the driving member, said gear train being so constructed and so connected to the unit that reaction to torque on the driven member tends to turn it in a direction opposite to that in which it is turned by the driving member.

ADIEL Y. DODGE.